United States Patent
Kinoshita et al.

(10) Patent No.: US 8,416,494 B2
(45) Date of Patent: Apr. 9, 2013

(54) SCREEN, PROJECTOR, AND IMAGE DISPLAY DEVICE

(75) Inventors: Satoshi Kinoshita, Matsumoto (JP); Eiji Morikuni, Matsumoto (JP); Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/067,654

(22) Filed: Jun. 17, 2011

(65) Prior Publication Data

US 2011/0249329 A1    Oct. 13, 2011

Related U.S. Application Data

(63) Continuation of application No. 12/654,444, filed on Dec. 18, 2009, now Pat. No. 7,986,457, which is a continuation of application No. 11/806,616, filed on Jun. 1, 2007, now Pat. No. 7,660,037.

(30) Foreign Application Priority Data

Jun. 6, 2006   (JP) ................................ 2006-157041
Jun. 6, 2006   (JP) ................................ 2006-157042

(51) Int. Cl.
    *G03B 21/56*    (2006.01)
(52) U.S. Cl.
    USPC ....................................................... 359/446
(58) Field of Classification Search .................. 359/443, 359/446; *G03B 21/562*
    See application file for complete search history.

(56) References Cited

U.S. PATENT DOCUMENTS

| | | | |
|---|---|---|---|
| 2,029,500 A | 2/1936 | O'Brien | |
| 2,348,818 A | 5/1944 | Jacobson | |
| 3,125,927 A | 3/1964 | Erban | |
| 3,610,728 A | 10/1971 | Firth | |
| 3,640,602 A | 2/1972 | Wolfe | |
| 4,033,683 A * | 7/1977 | Tancredi | 359/446 |
| 4,143,943 A | 3/1979 | Rawson | |
| 4,317,618 A | 3/1982 | Murakoshi | |
| 4,390,239 A | 6/1983 | Huber | |
| 5,513,037 A * | 4/1996 | Yoshida et al. | 359/457 |
| 6,317,169 B1 | 11/2001 | Smith | |
| 6,752,500 B1 | 6/2004 | Yoshii et al. | |
| 7,185,991 B2 | 3/2007 | Akiyama | |
| 7,688,506 B2 * | 3/2010 | Sugawara et al. | 359/446 |
| 2006/0028622 A1 | 2/2006 | Nojima et al. | |

(Continued)

FOREIGN PATENT DOCUMENTS

| | | |
|---|---|---|
| CN | 1178102 C | 12/2004 |
| CN | 1624570 A | 6/2005 |

(Continued)

OTHER PUBLICATIONS

Oct. 5, 2010 Office Action issued in U.S. Appl. No. 12/654,444.

(Continued)

*Primary Examiner* — Christopher Mahoney
(74) *Attorney, Agent, or Firm* — Oliff & Berridge, PLC

(57) ABSTRACT

A screen includes; a plurality of layers including a diffusion layer that diffuses incident light; an elastic member that movably supports the diffusion layer with respect to an arbitrary holding part; and a driving unit that moves the diffusion layer in a direction perpendicular to an optical axis of light that is incident to the diffusion layer.

12 Claims, 21 Drawing Sheets

U.S. PATENT DOCUMENTS

| | | |
|---|---|---|
| 2006/0126172 A1 | 6/2006 | Iwaki et al. |
| 2007/0035826 A1 | 2/2007 | Yokoyama et al. |
| 2007/0171521 A1 | 7/2007 | Sugawara et al. |
| 2007/0247707 A1 | 10/2007 | Michimori et al. |

FOREIGN PATENT DOCUMENTS

| | | |
|---|---|---|
| JP | B-49-005256 | 2/1974 |
| JP | A-55-065940 | 5/1980 |
| JP | A-55-146439 | 11/1980 |
| JP | U-59-20227 | 2/1984 |
| JP | U-59-121646 | 8/1984 |
| JP | A-1-319026 | 12/1989 |
| JP | U-03-114833 | 11/1991 |
| JP | A-2002-543455 | 12/2002 |
| JP | A-2003-262920 | 9/2003 |
| JP | A-2004-053640 | 2/2004 |
| JP | A-2005-107150 | 4/2005 |
| JP | A-2006-072319 | 3/2006 |
| JP | A-2006-343663 | 12/2006 |
| JP | A-2007-199292 | 8/2007 |
| JP | A-2007-298945 | 11/2007 |

OTHER PUBLICATIONS

Mar. 22, 2011 Notice of Allowance issued in U.S. Appl. No. 12/654,444.

* cited by examiner

SCREEN, PROJECTOR, AND IMAGE DISPLAY DEVICE

CROSS-REFERENCE TO RELATED APPLICATION

This is a Continuation of application Ser. No. 12/654,444 filed Dec. 18, 2009, which in turn is a Continuation of application Ser. No. 11/806,616 filed Jun. 1, 2007. The disclosure of the prior applications is hereby incorporated by reference herein in its entirety. This application claims priority on Japanese Patent Application No. 2006-157041, filed Jun. 6, 2006, and Japanese Patent Application No. 2006-157042, filed Jun. 6, 2006, the contents of which are incorporated herein by reference.

BACKGROUND

1. Technical Field

The present invention relates to a screen, a projector, and an image display device.

2. Related Art

The left-right direction mentioned in the present application is that viewed from the observer.

A screen for rear projection type projector generally has a two-layer configuration including a Fresnel lens sheet that collimates the direction of incident light to obtain emission light, and a lenticular lens sheet (diffusion lens sheet) that diffuse emission light from this Fresnel lens sheet in a left-right direction (horizontal direction) of the screen. This configuration leads to problems such as scintillation, where laser beams emitted from the same light source interfere with each other on the screen, or generation of a phenomenon known as speckling. Accordingly, screens are proposed for alleviating this interference (see for example Japanese Unexamined Patent Publication No. 2003-262920 and 2002-543455).

A rear projection type projector described in JP-A-2003-262920 includes a projection type display device arranged in a casing, a reflecting mirror that reflects projection light from the projection type display device, and a transparent screen that receives the projection light and displays an image. A flat actuator is provided on a rear face of the reflecting mirror, enabling speckling over the entire transparent screen to be reduced by making the flat actuator vibrate.

A projection type display described in JP-T-2002-543455 includes a light valve, a folding mirror, a projecting mirror, and a projection screen; processing of speckles on the screen being performed by making one of these vibrate at a frequency that is high enough to be invisible to a user.

However, the rear projection type projector described in JP-A-2003-262920 reduces scintillation only in the optical system that projects the image onto the screen and does not deal with interference generated on the screen where the image is formed, making it difficult to suppress scintillation reliably.

Furthermore, in the projection type display described in JP-T-2002-543455, since the projection screen is merely vibrated by, for example, mechanical unit, the image also moves, and this causes problems such as wobbling in the horizontal direction of the image as viewed by an observer, and wobbling of the focal point

SUMMARY

An advantage of some aspects of the invention is to provide a screen, a projector, and an image display device that can reduce scintillation and display a clear image.

A first aspect of the invention provides a screen including: a plurality of layers including a diffusion layer that diffuses incident light; an elastic member that movably supports the diffusion layer with respect to an arbitrary holding part; and a driving unit that moves the diffusion layer in a direction perpendicular to an optical axis of light that is incident to the diffusion layer.

According to the screen of the invention, since the holding part allows the diffusion layer to move via the elastic member, the diffusion layer can be moved in the direction perpendicular to the optical axis of the incident light by operating the driving unit. Consequently, the diffusion state of light that is emitted after being transmitted through the diffusion layer changes with time. Therefore, speckled patterns of light transmitted through the diffusion layer integrated over time due to a residual image effect, with a result that scintillation is reduced in light emitted from the screen, whereby a good image can be displayed.

Furthermore, since the elastic member is disposed between the holding part and the diffusion layer, a force supplied to the diffusion layer from the driving unit is transmitted via the diffusion layer to the elastic member. The force transmitted to the elastic member is repulsed by the holding part and transmitted once again to the diffusion layer by the elastic force of the elastic member. In addition to the force supplied from the driving unit, the elastic force of the elastic member makes the diffusion layer oscillate inside the holding part in the direction perpendicular to the optical axis. Since the diffusion layer moves (oscillates) in the direction perpendicular to the optical axis of light that is incident to it, it does not move in the optical axis direction. Therefore, generation of image blurring caused by fluctuation of the focusing point can be suppressed, and a clear image can be displayed.

It is preferable that, in the screen according to the first aspect of the invention, the driving unit drive the diffusion layer intermittently.

According to the screen of the invention, the diffusion layer is provided with an elastic member having elasticity, enabling the diffusion layer to be oscillated continuously by intermittent vibration of the driving unit. Since the diffusion layer oscillates continuously, the driving unit need not operate constantly. This allows the diffusion layer to be continuously operated efficiently, without using excess energy, and efficiently reduce scintillations.

It is preferable that, in the screen according to the first aspect of the invention, the elastic member include at least one expandable member that links the holding part and the diffusion layer, the diffusion layer hung on the holding part via the expandable member.

According to the screen of the invention, since the elastic member is an expandable member, the diffusion layer can be suspended in the holding part by using, for example, a suspension wire. Since this allows the diffusion layer to oscillate easily and freely, even if only a small force is supplied to the diffusion layer from the driving unit, the diffusion layer oscillates efficiently in the direction perpendicular to the optical axis of the light that is incident on the diffusion layer. Therefore, scintillation can be reduced more efficiently with a simple configuration.

It is preferable that, in the screen according to the first aspect of the invention, an elastic force of the elastic member be applied to the diffusion layer, in a predetermined direction within a diffusion plane of the diffusion layer, and in a direction that intersects the predetermined direction.

According to the screen of the invention, since the elastic force of the elastic member is applied in a predetermined direction within the diffusion plane of the diffusion layer, and in a direction that intersects the predetermined direction, the force that is transmitted to the elastic member and repulsed by the holding part is more easily transmitted to the elastic member. Since the elastic force of the elastic member is transmitted once again to the diffusion layer, the diffusion layer can easily oscillate in a circular path, an elliptical path, or an 8-shaped path. Since the diffusion layer oscillates continuously, it has no dead point (a point where the movement stops at least a moment), and consequently there is not a slightest moment of interference. Therefore, flicker-like (i.e., flickering of the image on the screen) speckling can be suppressed.

It is preferable that the screen according to the first aspect of the invention further include a restricting member that restricts movement of the diffusion layer in the optical axis direction of the incident light.

According to the screen of the invention, the restricting member restricts the movement of the diffusion layer in the optical axis direction of the incident light. This makes it possible to reliably suppress generation of image blurring caused by fluctuation in the focusing point when the diffusion layer is oscillated, whereby a clearer image can be displayed.

It is preferable that, in the screen according to the first aspect of the invention, a contacting part be provided in a surface of a layer among the plurality of layers, the layer being arranged next to the diffusion layer, the surface being one that faces the diffusion layer, and the contacting part contacting the diffusion layer and being rounded or chamfered.

According to the screen of the invention, the contacting part is provided on a face of another layer that is facing the diffusion layer when the layer contacts the diffusion layer, thereby preventing the diffusion layer from being damaged when it oscillates. Furthermore, since the contacting part is rounded or chamfered, abrasion caused by contact with the other layers and the diffusion layer can be suppressed.

It is preferable that, in the screen according to the first aspect of the invention, the driving unit be an actuator that performs a reciprocating operation.

According to the screen of the invention, since a small solenoid, for example, can be used as the driving unit, the overall size of the screen can be reduced.

It is preferable that, in the screen according to the first aspect of the invention, the driving unit be an actuator that performs a rotational operation.

According to the screen of the invention, since the driving unit is an actuator that performs a rotational operation, sound and vibration can be suppressed. Therefore, noise accompanying the operation of the driving unit can be prevented, and a quiet screen can be provided.

A second aspect of the invention provides a projector including: a light source device that emits light; a light modulation device that modulates light emitted from the light source device in accordance with an image signal; a projection device that projects light modulated by the light modulation device; and the screen according to the first aspect of the invention onto which an image emitted from the projection device is projected.

According to the projector of the invention, light emitted from the light source device is incident to the light modulation device. An image modulated by the light modulation device is then projected by the projection device onto the screen. At this time, since the screen being used is one that reduces scintillation while suppressing generation of image blurring, the image projected from the screen is displayed clearly and with no unevenness in its brightness.

A third aspect of the invention provides an image display device including: a light source device that emits light; a scanning unit that scans light emitted from the light source device; and the screen according to the first aspect of the invention onto which an image scanned by the scanning unit is projected.

According to the image display device of the invention, light emitted from the light source device is scanned by the scanning unit. Light scanned by the scanning unit is then projected onto the screen. At this time, since the screen being used is one that reduces scintillation while suppressing generation of image blurring, scintillation is suppressed in light emitted from the screen. Therefore, an image can be displayed clearly and with no unevenness in its brightness.

A fourth aspect of the invention provides a screen including: a plurality of layers including a diffusion layer that diffuses incident light; a supporting member that is provided outside an image formation region in the diffusion layer, and movably supports the diffusion layer, and a driving unit that continuously moves the diffusion layer.

According to the screen of the invention, the diffusion layer is oscillated by operating the driving unit. Consequently, the diffusion state of light that is transmitted through the diffusion layer and emitted from it changes with time. Therefore, speckled patterns of light transmitted through a diffusion member integrated over time due to a residual image effect, with a result that scintillation is reduced in light emitted from the screen, whereby a good image can be displayed.

Furthermore, since the supporting member supports the diffusion layer outside the image formation region, the movement of the diffusion layer in the optical axis direction can be restricted without affecting the displayed image even if, for example, the supported point is a fixed point (dead point). Therefore, a clear image can be displayed.

Moreover, since the driving unit moves (oscillates) the diffusion layer continuously, the diffusion layer has no dead point (a point where it stops moving at least a moment), and consequently there is not a slightest moment of interference. Therefore, flicker-like (i.e., flickering of the image on the screen) speckling can be continuously suppressed.

It is preferable that, in the screen according to the fourth aspect of the invention, the supporting member be constituted by an elastic member provided between the diffusion layer and an arbitrary holding part that holds the diffusion layer, the diffusion layer being held by the holding part with the elastic member therebetween.

According to the screen of the invention, since the elastic member is provided between the holding part and the diffusion layer, the force supplied to the diffusion layer by the driving unit is transmitted via the diffusion layer to the elastic member. The force transmitted to the elastic member is repulsed by the holding part, and transmitted once again to the diffusion layer by the elastic force of the elastic member. Consequently, in addition to the force supplied from the driving unit, the elastic force of the elastic member makes the diffusion layer oscillate in the direction perpendicular to the optical axis inside the holding part.

It is preferable that, in the screen according to the fourth aspect of the invention, the supporting member be constituted by at least one expandable member that links the diffusion layer and an arbitrary holding part that holds the diffusion layer, the diffusion layer hung on the holding part by the expandable member.

According to the screen of the invention, since the supporting member is constituted by the expandable member, the diffusion layer can be suspended in the holding part by using, for example, a suspension wire. Since this allows the diffusion layer to oscillate easily and freely, even if only a small force is supplied to the diffusion layer from the driving unit, the diffusion layer oscillates efficiently in the direction perpendicular to the optical axis of the light that is incident on it. Therefore, scintillation can be reduced more efficiently with a simple configuration.

It is preferable that, in the screen according to the fourth aspect of the invention, the driving unit include a connecting member that is connected to the diffusion layer and allows the diffusion layer to move.

According to the screen of the invention, since the diffusion layer is connected by the connecting member of the driving unit, the driving force of the driving unit is transmitted via the connecting member to the diffusion layer, enabling the diffusion layer to be oscillated easily.

It is preferable that the screen according to the fourth aspect of the invention further include a restricting member that restricts movement of the diffusion layer in an optical axis direction of the incident light.

According to the screen of the invention, the restricting member restricts the movement of the diffusion layer in the optical axis direction of the incident light. This can reliably suppress generation of image blurring caused by fluctuation in the focusing point when the diffusion layer is oscillated, whereby a clearer image can be displayed.

It is preferable that, in the screen according to the fourth aspect of the invention, the supporting member restricts the movement of the diffusion layer by using a repulsive force generated along the optical axis of light that is incident to the diffusion layer.

According to the screen of the invention, the supporting member uses a repulsive force generated along the optical axis of light that is incident on the diffusion layer to restrict the movement of the diffusion layer in the optical axis direction. By using the repulsive force in this manner to restrict the movement of the diffusion layer, generation of image blurring caused by fluctuation of the focusing point can be reliably suppressed while allowing the diffusion layer to move more freely in the direction perpendicular to the optical axis, whereby the diffusion layer can be efficiently oscillated with a simple configuration.

It is preferable that, in the screen according to the fourth aspect of the invention, the driving unit be an actuator that performs a reciprocating operation.

According to the screen of the invention, since a small solenoid, for example, can be used as the driving unit, the overall size of the screen can be reduced.

It is preferable that, in the screen according to the fourth aspect of the invention, the driving unit be an actuator that performs a rotational operation.

According to the screen of the invention, since the driving unit is an actuator that performs a rotational operation, sound and vibration can be suppressed. Therefore, noise accompanying the operation of the driving unit can be prevented, and a quiet screen can be provided.

A fifth aspect of the invention provides a projector including: a light source device that emits light; a light modulation device that modulates light emitted from the light source device in accordance with an image signal; a projection device that projects light modulated by the light modulation device; and the screen according to the fourth aspect of the invention onto which an image emitted from the projection device is projected.

According to the projector of the invention, light emitted from the light source device is incident on the light modulation device. The projection device projects an image modulated by the light modulation device onto the screen. At this time, since the screen being used is one that reduces scintillation while suppressing generation of image blurring, the image projected from the screen is displayed clearly and with no unevenness in its brightness.

A sixth aspect of the invention provides an image display device including: a light source device that emits light; a scanning unit that scans light emitted from the light source device; and the screen according to the fourth aspect of the invention onto which an image scanned by the scanning unit is projected.

According to the image display device of the invention, the light emitted from the light source device is scanned by the scanning unit. The light scanned by the scanning unit is then projected onto the screen. At this time, since the screen being used is one that reduces scintillation while suppressing generation of image blurring, scintillation is suppressed in the light emitted from the screen. Therefore, an image can be displayed clearly and with no unevenness in its brightness.

DESCRIPTION OF EXEMPLARY EMBODIMENTS

Figure 1A:
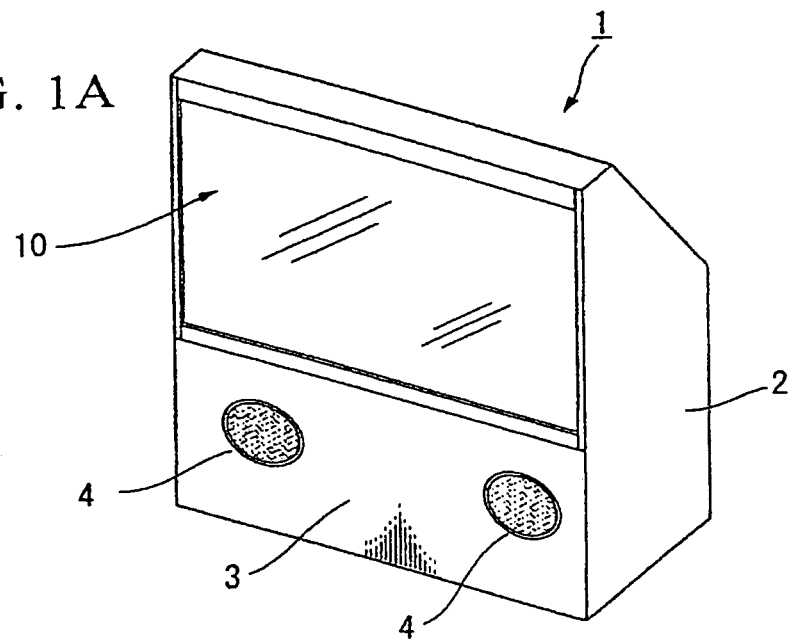
FIGS. 1A and 1B are a perspective view and a side cross-sectional view, respectively, showing the schematic structure of the rear projector according to a first embodiment of the invention.

Embodiments of a screen, a rear projector, and an image display device according to the invention will be explained with reference to the drawings. In the drawings referred to below, dimensions of members are changed as appropriate to make them more easily discernible.

First Embodiment

Figure 1B:
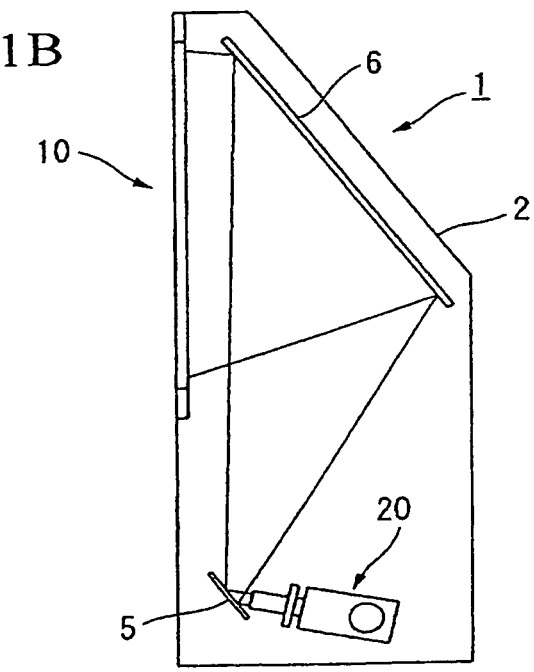

FIG. 1A is a perspective view of a schematic structure of a rear projector (projector) 1 according to this embodiment, and FIG. 1B is a side cross-sectional view of the rear projector 1 shown in FIG. 1A. The rear projector 1 according to this embodiment uses a light modulation unit to modulate light emitted from a light source device, and projects this modulated light in an enlargement on a screen 10.

As shown in FIG. 1A, the rear projector 1 includes a casing (holding unit) 2, and a screen 10 that is attached to a front face of the casing 2 and which an image is projected onto. A front panel 3 is provided in a portion of the casing 2 below the screen 10, and openings 4 for outputting sound from speakers are provided on left and right sides of the front panel 3.

The internal structure of the casing 2 of the rear projector 1 will be explained.

As shown in FIG. 1B, a projection optical system 20 is arranged at the bottom of the inside of the casing 2 of the rear projector 1. Reflecting mirrors 5 and 6 are provided inside the casing 2, forming an optical path wherein light emitted from the projection optical system 20 is reflected by these mirrors 5 and 6 and reaches the screen 10. Light projected from the projection optical system 20 is enlarged and projected onto the screen 10.

A schematic structure of the projection optical system 20 of the rear projector 1 will be explained.

Figure 2:
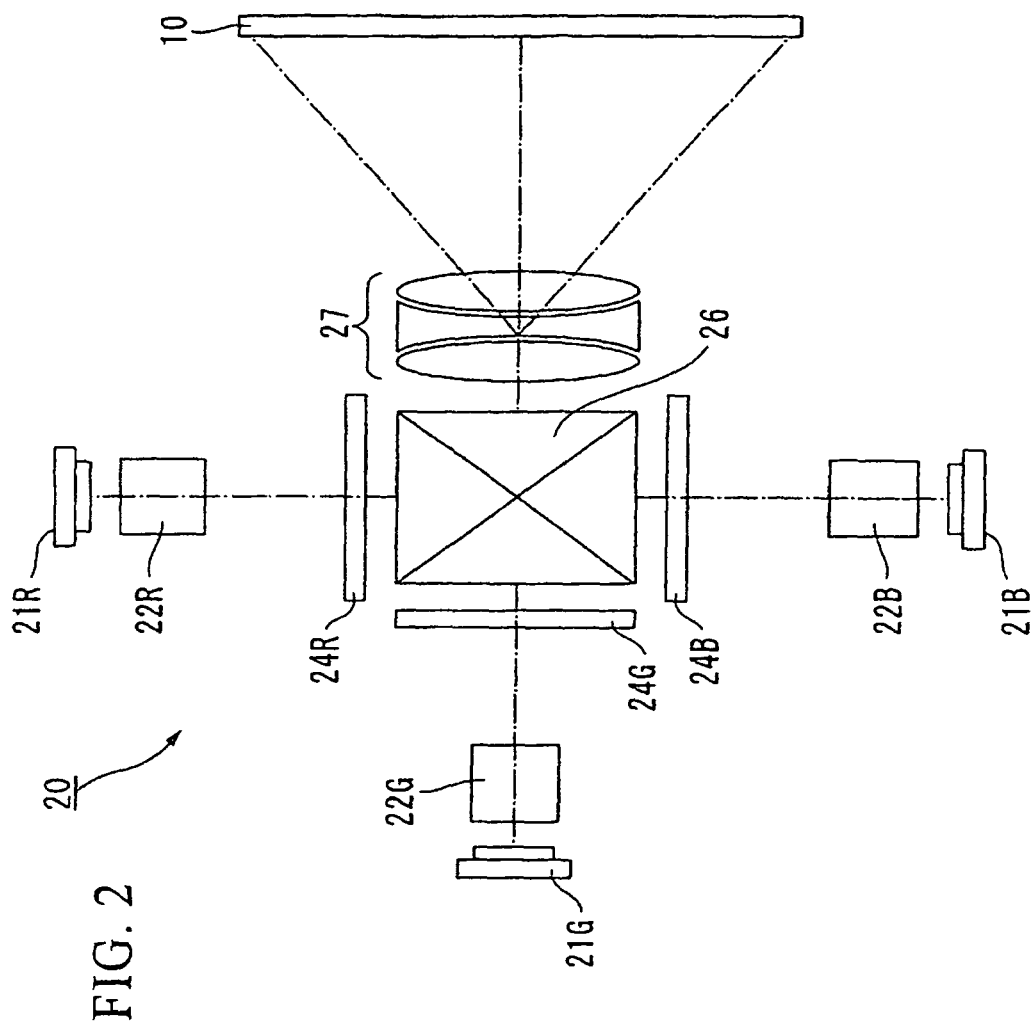
FIG. 2 is a schematic structural view showing the projection optical system and the screen of the rear projector of FIGS. 1A and 1B.

FIG. 2 is a schematic view of the configuration of the projection optical system 20 of the rear projector 1. For simplification, the casing 2 of the rear projector 1 is omitted from FIG. 2.

The projection optical system 20 includes a red laser light source (light source device) 21R that emits red light, a green laser light source (light source device) 21G that emits green light, a blue laser light source (laser light source) 21B that emits blue light, liquid crystal light valves (light modulation devices) 24R, 24G and 24B that respectively modulate laser light emitted from the laser light sources 21R, 21G, and 21B, a cross dichroic prism (colored light synthesizing unit) 26 that synthesizes laser lights modulated by the liquid crystal light valves 24R, 24G, and 24B, and a projection lens (projection device) 27 that enlarges and projects the laser light synthesized by the cross dichroic prism 26.

As uniform illumination systems for uniformizing the illuminance distribution of laser lights emitted from the laser light sources 21R, 21G and 21B, the projection optical system 20 includes illumination optical systems 22R, 22G, and 22B that are arranged in the emission directions of the respective laser light sources 21R, 21G, and 21B, and direct the laser light to the liquid crystal light valves 24R, 24G, and 24B. For example, the illumination optical systems 22R, 22G, and 22B include holograms and field lenses.

Polarization plates (not shown) are provided on incidence sides and emission sides of the liquid crystal light valves 24R, 24G, and 24B. Of the beams from the laser light sources 21R, 21G, and 21B, only light that is linearly polarized in a predetermined direction is transmitted through the incidence side polarization plate, and is incident on the liquid crystal light valves 24R, 24G, and 24B. A polarization conversion unit (not shown) can be provided in front of the incidence side polarization plate. In this case, the polarization conversion unit converts the light such that it is transmitted through the incidence side polarization plate, thereby increasing the light utilization efficiency.

The three colored lights modulated by the liquid crystal light valves 24R, 24G, and 24B are incident on the cross dichroic prism 26. This prism is formed by combining together four right-angled prisms, with dielectric multilayer films for reflecting red light and dielectric multilayer films for reflecting blue light arranged in a cross shape on inner faces thereof. The dielectric multilayer films synthesize the three colored lights, forming light that expresses a color image. The synthesized light is projected onto the screen 10 by the projection lens 27 contained in the projection optical system, and an enlarged image is displayed.

Subsequently, the screen 10 will be explained in detail.

Figure 3:
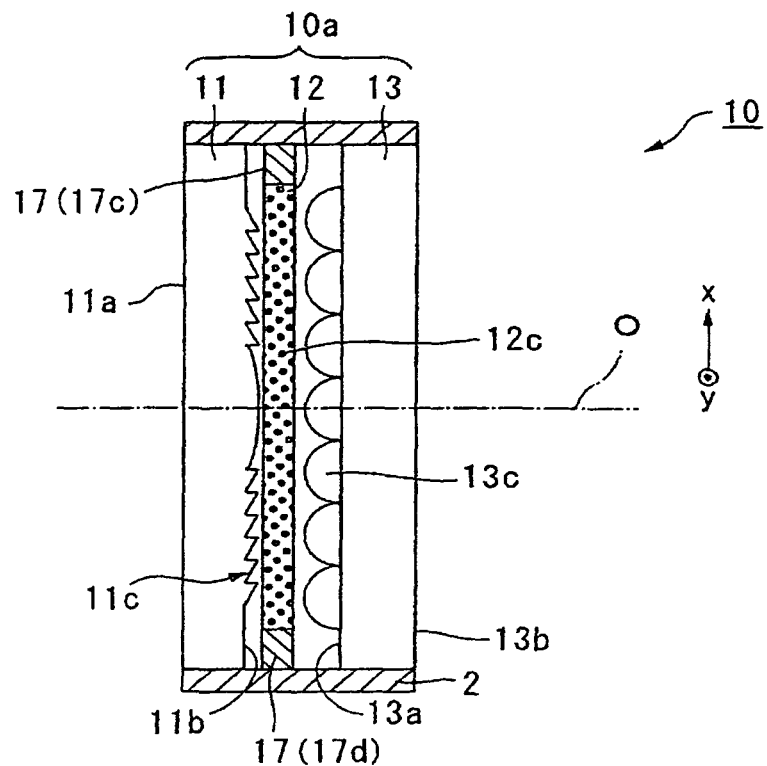
FIG. 3 is a cross-sectional view showing the screen used in the rear projector of FIGS. 1A and 1B.
Figure 5:
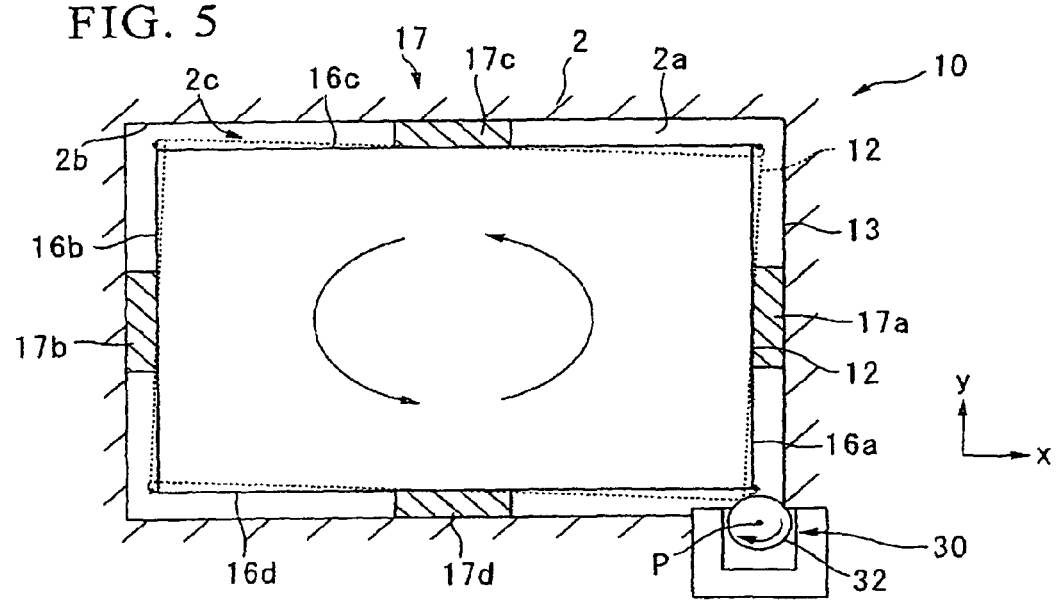
FIG. 5 is a plan view showing the configuration of the screen of the rear projector of FIGS. 1A and 1B.

As shown in FIGS. 3 and 5, the screen 10 includes a screen body 10a, an elastic rubber part (elastic member) 17, and a driving unit (driving unit: actuator) 30.

Firstly, the overall configuration of the screen body 10a will be explained.

Figure 4:
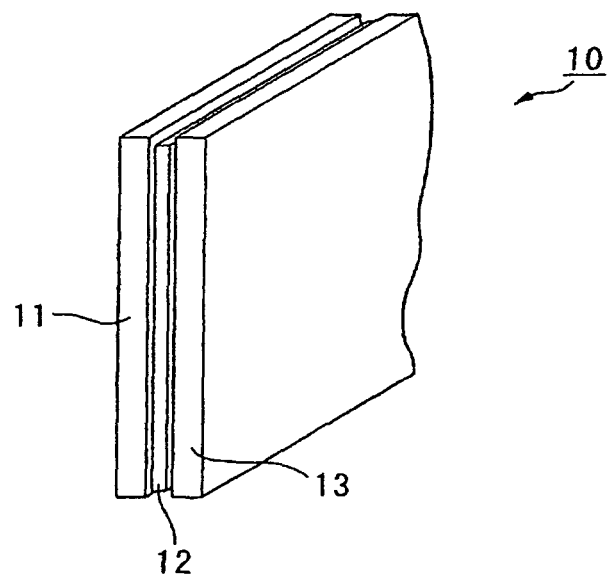
FIG. 4 is a perspective view showing the screen of the rear projector of FIGS. 1A and 1B.

As shown in FIG. 4, the screen body 10a includes a Fresnel plate 11 that converts the angle of incident light, a light-transmitting lenticular plate (diffusion layer) 13, and a diffusion plate (diffusion layer) 12 that is arranged between the Fresnel plate 11 and the lenticular plate 13, and diffuses incident light.

As shown in FIG. 5, an opening 2a is provided in the front face of the casing 2. A gap 2c is provided between an inner wall face 2b of the opening 2a and an outer periphery of the diffusion plate 12.

Subsequently, the rubber part 17 will be explained.

As shown in FIG. 5, the flat plate rubber part 17 includes a rubber 17a that is provided between an inner face wall 2b of the casing 2 and a right-side face 16a of the diffusion plate 12 such as to fill the gap 2c. Similarly, the rubber part 17 also includes a rubber 17b, a rubber 17c, and a rubber 17d, respectively provided between the inner face wall 2b of the casing 2 and a left-side face 16b of the diffusion plate 12, between the inner face wall 2b of the casing 2 and a top-side face 16c of the diffusion plate 12, and between the inner face wall 2b of the casing 2 and a bottom-side face 16d of the diffusion plate 12. The elastic forces of the rubbers 17a, 17b, 17c, and 17d act in an x-direction (a predetermined direction within the diffusion plane of the diffusion plate: a horizontal direction when the screen is installed) and in a y-direction (a direction that intersects this predetermined direction: a vertical direction when the screen is installed).

The rubbers 17a, 17b, 17c, and 17d are arranged near the centers of the respective faces 16a, 16b, 16c, and 16d. This allows the diffusion plate 12 to be uniformly oscillated in the opening 2a of the casing 2.

While the rubbers here are flat plates, L-shaped rubbers can be arranged at one corner of the diffusion plate 12 and at an opposite corner thereto.

Subsequently, the screen body 10a will be explained in detail.

The Fresnel plate 11 will be explained first.

As shown in FIG. 3, the Fresnel plate 11 includes a prism-shaped Fresnel lens 11c that is formed in an approximately concentric arrangement along an emission face 11b opposite to an incidence face 11a. The Fresnel lens 11c refracts laser light that is emitted from the projection lens 27 and is incident from the incidence face 11a, converts it to parallel light, and emits it from the emission face 11b.

The apexes of protruding sections of the Fresnel lens 11c are chamfered. Alternatively, they can be rounded. Rounding indicates curved faces on the protruding sections which are concave pointing the emission face 11b side.

Subsequently, the lenticular plate 13 will be explained.

As shown in FIG. 3, a plurality of half-cylindrical microlens elements 13c are provided in an incidence face 13a of the lenticular plate 13 on the incident side of the laser light. In a flat plane (xy plane) perpendicular to the optical axis O, the longitudinal direction of the plurality of microlens elements 13c is parallel to the y-direction (vertical direction when the screen is installed) and the microlens elements 13c are arranged side-by-side in the x-direction. The apexes of the microlens elements 13c are rounded. They can be chamfered instead. Rounding indicates curved faces on the protruding sections which are concave pointing the incidence face 13a side.

The lenticular plate 13 diffuses laser light that is incident from the incidence face 13a over a predetermined angular range and emits the light from the emitting face 13b, widening the view angle of the image and enabling a good image to be observed even if the observer moves in a horizontal direction from the front face of the screen 10 to a position within the predetermined angular range. A light-transmitting material can be used for the lenticular plate 13.

As material for the Fresnel plate 11 and the lenticular plate 13, for example, acrylic resin, polycarbonate resin, thermoplastic resin such as vinyl chloride resin, and cycloolefin resin, and the like, can be used. It is preferable to use, a rigid material that transmits light; moreover, surface abrasion-resistance and corrosion-resistance are preferably considered when selecting a material. This ensures high reliability of the Fresnel plate 11 and the lenticular plate 13.

Subsequently, the diffusion plate 12 will be explained.

As shown in FIG. 3, the diffusion plate 12 diffuses laser light emitted from the emission face 11b of the Fresnel plate 11 and emits it toward the incidence face 13a of the lenticular plate 13. Diffusive particles 12c are scattered inside the diffusion plate 12. Specifically, fine particles (beads) of silica, glass, resin, and the like can be used. While there is no restriction on the average particle diameter of the particles 12c, it is preferably between 0.5 μm and 50 μm.

Cycloolefin resin is one example of a material that can be used for the diffusion plate.

Figure 6:
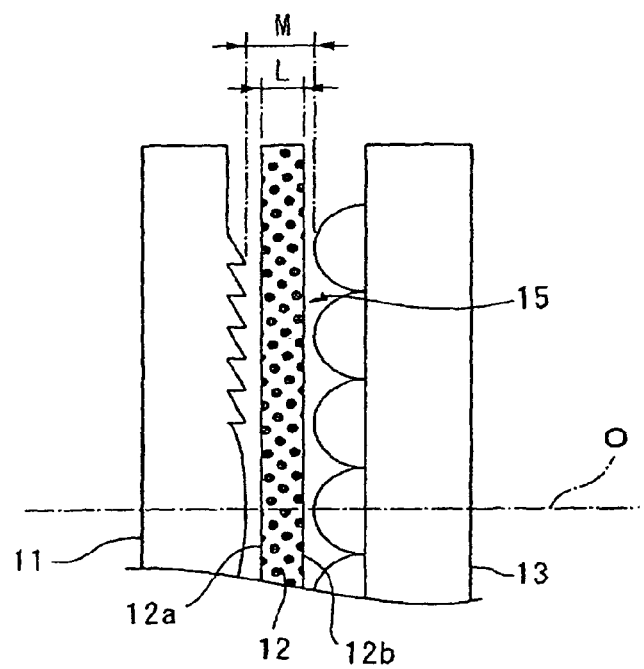
FIG. 6 is a cross-sectional view showing the screen of the rear projector of FIGS. 1A and 1B.

As shown in FIG. 6, the thickness L of the diffusion plate 12 is approximately two-thirds of the interval M of a gap 15 between the Fresnel plate 11 and the lenticular plate 13. The thickness L of the diffusion plate 12 is preferably greater than half of the interval M of the gap 15. With this configuration, the diffusion plate 12 does not bend significantly, since it does not deviate in the direction of the optical axis O between the Fresnel plate 11 and the lenticular plate 13 by an amount equivalent to its thickness L.

That is, by moving the diffusion plate 12 within the gap 15 which is wider than the thickness L of the diffusion plate 12 at a difference below a predetermined width, the diffusion plate 12 does not deviate more than a predetermined distance in the focusing direction, and consequently the image is not disrupted by focal blurring. Furthermore, since the gap 15 can restrict the movement of the diffusion plate 12, the diffusion plate 12 can be moved while tensing it such that it does not bend, without using a holding member to hold the diffusion plate 12 even if it is thin (e.g., thickness: 0.5 mm, size: several tens of inches).

Since this allows the mass of the diffusion plate 12 to be reduced, it can be moved easily; in addition, the overall screen 10 can be made smaller.

The incidence face (the face opposite the Fresnel plate) 12a and the emission face (the face opposite the lenticular plate) 12b of the diffusion plate 12 shown in FIG. 6 are processed to prevent static.

The Fresnel plate 11, the lenticular plate 13, and the diffusion plate 12 are made from plastic materials of acrylic resin and the like. This reduces the overall weight of the screen 10. It is particularly important to reduce the weight of the diffusion plate 12 since it is a vibrating member. However, when a plastic material is used to form the diffusion plate 12, static electricity is generated and becomes a large resisting force when the diffusion plate 12 vibrates. The resistance generated by static electricity at this time can be reduced by applying antistatic processing to the incidence face 12a and the emission face 12b of the diffusion plate 12. As the method of antistatic processing, an antistatic processing agent can be mixed in the plastic material or applied on the faces.

Subsequently, the driving unit 30 will be explained.

As shown in FIG. 5, the screen 10 is equipped with a driving unit 30 that rotates, thereby making the diffusion plate 12 oscillate. Specifically, the driving unit 30 is provided at the bottom face 16d side of the diffusion plate 12, and makes the diffusion plate 12 oscillate parallel to its emission face (diffusion face) 12b via the rubber part 17. The driving unit 30 operates intermittently, and vibrates the diffusion plate 12 continuously. The driving unit 30 continuously vibrates the diffusion plate 12 in a direction parallel to the emission face 12b that diffuses the laser light (xy plane direction), i.e., a direction perpendicular to the optical axis O of the laser light shown in FIG. 3. The frequency at which the diffusion plate 12 is vibrated is set higher than a flicker frequency visible to the human eye.

As shown in FIG. 5, the driving unit 30 includes a disk-shaped driving plate 32 that rotates clockwise around a central axis P. As shown by the broken line in FIG. 5, the diffusion plate 12 can contact the disk-shaped driving plate 32. When the face 16d of the diffusion plate 12 contacts the driving plate 32, it is pushed in the rotational direction (i.e., upward) and the diffusion plate 12 oscillates along a circular path.

The diffusion plate 12 can also be moved along an elliptical path, or along an 8-shaped path.

Subsequently, a method of projecting an image onto the screen 10 using the rear projector 1 of this embodiment having the above configuration will be explained.

Firstly, as shown in FIG. 2, the illuminance distribution of laser lights emitted from the laser light sources 21R, 21G, and 21B is made to have approximately uniform illuminance distribution by the illumination optical systems 22R, 22G, and 22B, and the lights are then incident on the liquid crystal light valves 24R, 24G, and 24B. The incident laser lights are modulated by the liquid crystal light valves 24R, 24G, and 24B, and are incident on the cross dichroic prism 26. The cross dichroic prism 26 synthesizes R light, G light, and B light modulated respectively by the liquid crystal light valves 24R, 24G, and 24B. Light synthesized by the cross dichroic prism 26 is projected onto the screen 10 by the projection lens 27.

Figure 7:
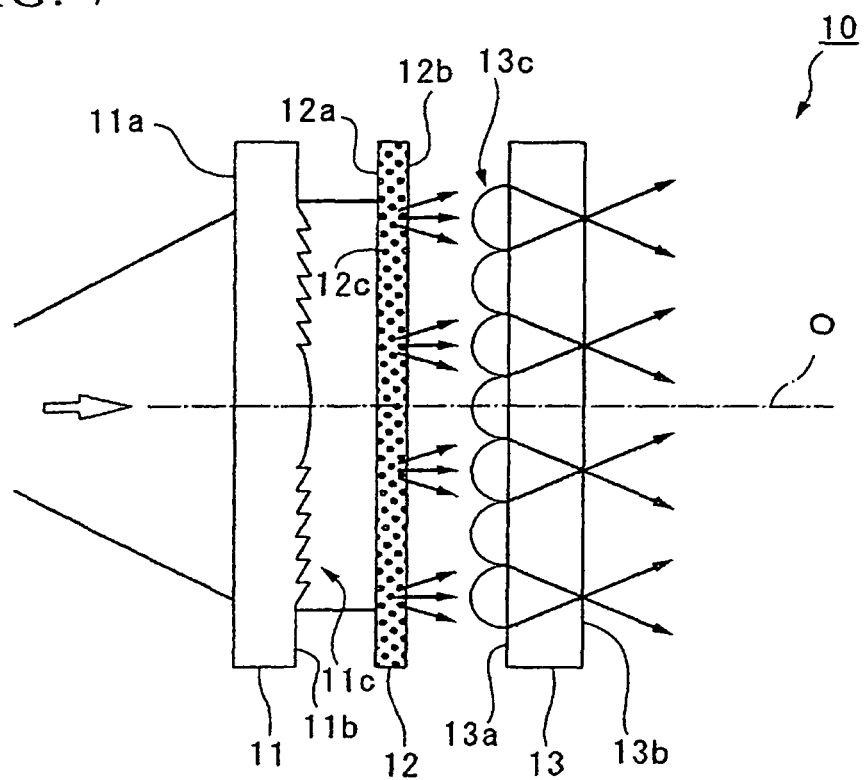
FIG. 7 is a cross-sectional view schematically showing the laser light transmitted through the screen of the rear projector of FIGS. 1A and 1B.

As shown schematically in FIG. 7, laser light projected onto the screen 10 is incident from the incidence face 11*a* of the Fresnel plate 11, by which it is refracted and becomes collimated light. The collimated light emitted from the emission face 11*b* of the Fresnel plate 11 is diffused by the diffusion plate 12 in random directions, and the diffused lights are incident on the incidence face 13*a* of the lenticular plate 13. Light emitted from the lenticular plate 13 is diffused over a predetermined angular range. As shown in FIG. 5, when the diffusion plate 12 contacts the driving plate 32, the diffusion plate 12 is pushed upward in conjunction with the rotational of the driving plate 32 and subsequently moves away from the driving plate 32. That is, the force supplied to the diffusion plate 12 is transmitted to the rubber 17*c* on the top-side face 16*c*, repelled by the inner wall face 2*b* of the casing 2, and transmitted once again to the diffusion plate 12 by the elasticity of the rubber 17*c*. Since the force supplied to the diffusion plate 12 is simultaneously transmitted to the rubbers 17*b*, 17*c*, and 17*d*, the diffusion plate 12 oscillates along the circular track shown in FIG. 5.

Subsequently, the diffusion plate 12, after the oscillation attenuates by a predetermined amount, contacts the driving plate 32, as shown in FIG. 5 by a dotted-line rectangle, and thereby is pushed upward once again.

In the rear projector 1 according to this embodiment, due to the provision of the rubber part 17, the elasticity of the rubbers 17*a*, 17*b*, 17*c*, and 17*d* arranged on each of the faces 16*a*, 16*b*, 16*c*, and 16*d* of the diffusion plate 12 of the screen body 10*a* makes the diffusion plate 12 oscillate in the direction perpendicular to the optical axis O in the opening 2*a* of the casing 2. Due to the driving plate 32, when the diffusion plate 12 oscillates, the rubber part 17 allows it to continue moving for a while, so that the driving plate 32 need only be driven intermittently. Therefore, since the driving plate 32 need not be driven constantly, the diffusion plate 12 can be operated continuously and efficiently without consuming excess energy, enabling scintillation to be efficiently reduced.

By using the rotating driving plate 32 to make the diffusion plate 12 oscillate, generation of sound and vibration can be suppressed. This can prevent noise that accompanies operation of the driving unit 30, and keeps the screen 10 quiet.

The driving plate 32 can be driven continuously to make the driving unit 30 easier to control; moving it intermittently, as in this embodiment, saves power.

While rubber is used here as an elastic member, any elastic member such as silicone and foaming material is acceptable; for example, a coil spring and a leaf spring can also be used.

Figure 8:
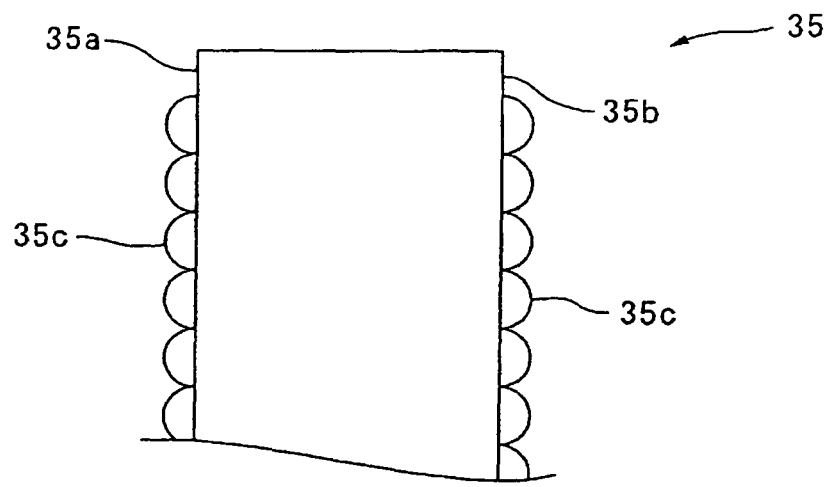
FIG. 8 is a cross-sectional view of the modification showing the diffusion plate of the screen of the rear projector of FIGS. 1A and 1B.

While in this embodiment diffusive particles are scattered inside the diffusion plate 12, as shown in FIG. 8, a diffusion plate (diffusion member) 35 can include a plurality of bumps 35*c* on its incidence face 35*a* and its emission face 35*b*. In this configuration, light that is incident on the diffusion plate 35 is diffused by the plurality of bumps 35*c*, whereby the configuration is simpler and laser light that is incident on the diffusion plate 35 can be made diffusive. While incident laser light can be diffused even if the plurality of bumps 35*c* are only formed on at least one of the incidence face 35*a* and the emission face 35*b*, the incident laser light is diffused more effectively if the bumps 35*c* are provided on both the incidence face 35*a* and the emission face 35*b*.

Second Embodiment

Subsequently, a second embodiment of the invention will be explained with reference to FIG. 9. Parts which are common to the configuration of the screen 10 of the rear projector according to the first embodiment described above are represented by the same reference symbols, and are not repetitiously explained.

A screen 40 according to this embodiment differs from the first embodiment in regard to the configuration of a driving unit (driving unit: actuator) 45 that performs a reciprocating movement.

The driving unit 45 has a solenoid 47 that is driven by a movable unit 46 using electromagnetic power. The movable unit 46 is arranged in a coil (not shown), and moves directly forward by an application of current to the coil. The solenoid 47 is tilted at approximately 45° with respect to a bottom face 12*d* of a diffusion plate 12, and the movable unit 46 thrusts the bottom face 12*d* of the diffusion plate 12 upward at 45°.

The diffusion plate 12 is suspended from above by an elastic suspension wire (elastic member: expandable member) 41 near the center of its top side (one side). This gives the diffusion plate 12 freedom for considerable movement, except at the supporting point of the suspension wire 41.

Because a method of projecting laser light onto the screen 40 is the same as that of the first embodiment, only the screen 40 will be explained here.

Figure 9:
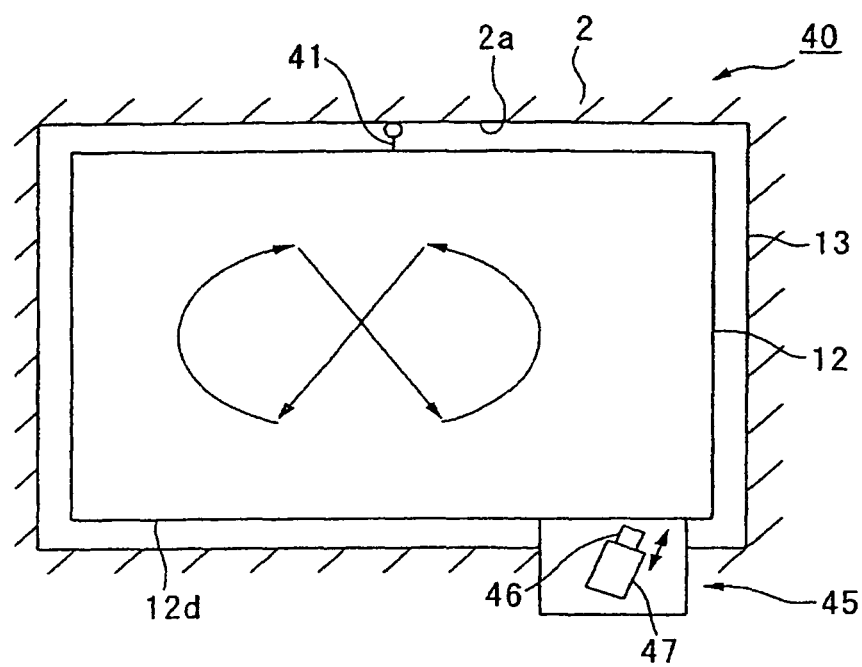
FIG. 9 is a plan view of the screen according to a second embodiment of the invention.

The solenoid 47 makes the movable unit 46 apply a force that thrusts the bottom face 12*d* of the diffusion plate 12 upward at 45°, whereby, as shown in FIG. 9, the diffusion plate 12 moves along an 8-shaped path. Due to the elasticity of the suspension wire 41, the movement of the diffusion plate 12 attenuates in a predetermined period of time while it continues to vibrate along the 8-shaped path. The solenoid 47 does not apply force to the diffusion plate 12 while the diffusion plate 12 is continuing to vibrate along this 8-shaped path. When the attenuation reaches a predetermined amount, the solenoid 47 starts operating again and pushes the diffusion plate 12 upward at 45°.

In the rear projector according to this embodiment, since the diffusion plate 12 is vibrated by the solenoid 47 and suspended by the elastic suspension wire 41, it need not be driven constantly. This achieves continuous operation efficiently, without consumption of excess energy, and can reduce scintillation of laser light emitted from the screen 40. Also, since the solenoid 47 is small, the overall size of the screen 40 can be reduced.

While the suspension wire 41 is used here as an expandable member, it is equally acceptable to use an expandable film, a rubber string, a flat rubber, a coil spring, etc. While one suspension wire 41 is described here, a plurality of them can be provided. When using a plurality of suspension wires, the diffusion plate 12 is stably held in the opening 2*a* of the casing 2.

Third Embodiment

Subsequently, a third embodiment of the invention will be explained with reference to FIG. 10.

A screen 50 according to this embodiment differs from the first embodiment in that a lenticular plate 13 is not used and a screen body 50*a* has a two-layer structure.

The screen body 50*a* includes a Fresnel plate (an additional layer) 51 and a diffusion plate (a diffusion layer) 52 similar to that of the first embodiment.

Figure 10:
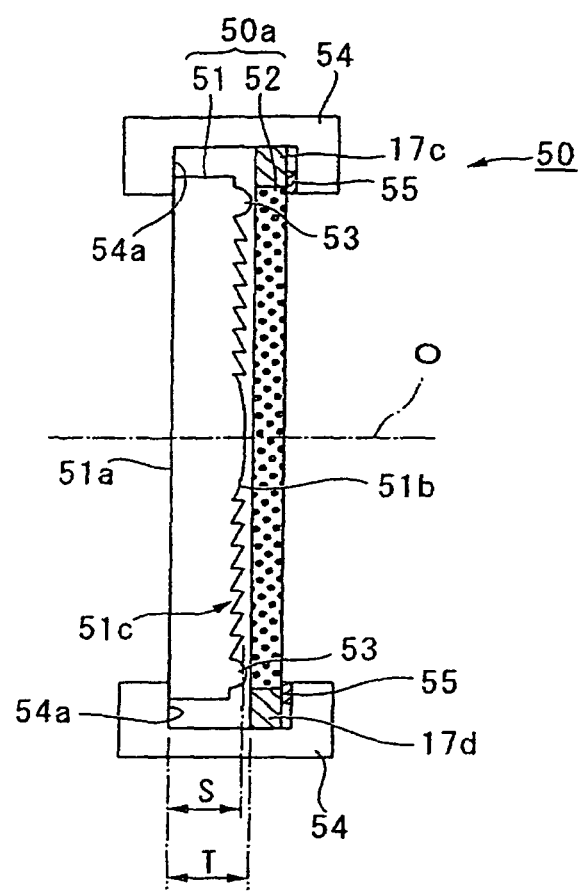
FIG. 10 is a cross-sectional view of the screen according to a third embodiment of the invention.

In the Fresnel plate 51 shown in FIG. 10, a contacting part 53 is arranged along the outer periphery of a surface facing the diffusion plate (diffusion layer) 52, i.e., the emission face 51b that a Fresnel lens 51c is disposed on. The contacting part 53 should have a smooth shape; in this embodiment it is rounded. The thickness T from an incidence face 51a of the Fresnel plate 51 to the tip of the contacting part 53 of the emission face 51b is greater than the thickness S from the incidence face 51a of the Fresnel plate 51 to the face of the emission face 51b where the Fresnel lens 51c is disposed. Thus, since the Fresnel plate 51 contacts the diffusion plate 52 at the contacting part 53, this configuration ensures that the sharp portions at the apexes of the protruding sections of the Fresnel lens 51c do not contact the diffusion plate 52.

The screen body 50a is fitted with a restricting member 54 for restricting the movement of the diffusion plate 52 in the optical axis O direction (the direction perpendicular to the diffusion plane of the diffusion layer). The restricting member 54 is disposed along the outer peripheries of the Fresnel plate 51 and the diffusion plate 52. In the cross-sectional view, the restricting member 54 includes at its center an indented section 54a into which the Fresnel plate 51 and the diffusion plate 52 are inserted.

A rubber 55 is provided on an inner side face of the indented section 54a of the restricting member 54 on the diffusion plate 52 side. The rubber 55, the diffusion plate 52, and the Fresnel plate 51 are inserted into the indented section 54a, whereby the screen body 50a is held by the restricting member 54 with the rubber 55 therebetween. This reliably restricts the movement of the diffusion plate 52 in the optical axis O direction.

Since the rear projector according to this embodiment includes the restricting member 54, the diffusion plate 52 is restricted from moving in the optical axis O direction of the incident light. This can reliably suppress generation of image blurring caused by fluctuation of the focal point when the diffusion plate 52 is oscillated, enabling a clearer image to be displayed.

Since the contacting part 53 prevents the sharp portions at the apexes of the protruding sections of the Fresnel lens 51c from contacting the diffusion plate 52, the diffusion plate 52 is prevented from being damaged. Also, since the contacting part 53 is rounded, abrasions caused when the Fresnel plate 51 contacts the diffusion plate 52 can be suppressed.

The contacting part 53 can be chamfered instead of rounded. While the contacting part 53 is here provided around the outer periphery of the Fresnel plate, the protruding part of the central part of the Fresnel plate 51 can be used as a contacting part. Similarly in this case, the thickness from the incidence face 51a of the Fresnel plate 51 to the protruding part of the central part of the emission face need only be greater than the thickness S from the incidence face 51a of the Fresnel plate 51 to the face of the emission face 51b where the Fresnel lens 51c is disposed.

While the diffusion plate 52 is here provided on the emission face 51b side (observer side) of the Fresnel plate 51, it can be provided on the incidence face 51a side of the Fresnel plate 51.

While this embodiment uses the rubber 55, any elastic member is acceptable, it being possible to use a coil spring and the like. The rubber 55 can be provided in the indented section 54a of the restricting member 54 between the Fresnel plate 51 and the diffusion plate 52.

It is preferable to lubricate the sliding faces of the Fresnel plate 51 and the diffusion plate 52 and the contacting faces of the diffusion plate 52 and the restricting member 54 when the diffusion plate 52 oscillates. While this can be achieved by wet lubrication, a process such as dry fluorination is more effective since there is less likely to be seepage to the outside. A lubrication effect can be achieved at portions such as those where the diffusion plate 52 and the Fresnel plate 51 rub together, by using, for at least one of those two members, polytetrafluoroethylene (PTFE) resin or a metal member whose surface is lubricated.

The rubber 55 need not be used if the Fresnel plate 51 and the diffusion plate 52 are highly precise, and if no image burring is caused by moving the diffusion plate 52 in the optical axis O direction (focusing direction).

The lenticular plate 13 used in the first embodiment can be used instead of the diffusion plate 52, the lenticular plate 13 being made to oscillate as a diffusion layer. In this configuration, scintillation is suppressed in the light emitted from the screen 50 in the same manner as when the diffusion plate 52 is oscillated, enabling a good image to be displayed.

Fourth Embodiment

Subsequently, a fourth embodiment of the invention will be explained with reference to FIG. 11.

According to this embodiment, the screen 10 of the first embodiment is applied in an image display device.

Figure 11:
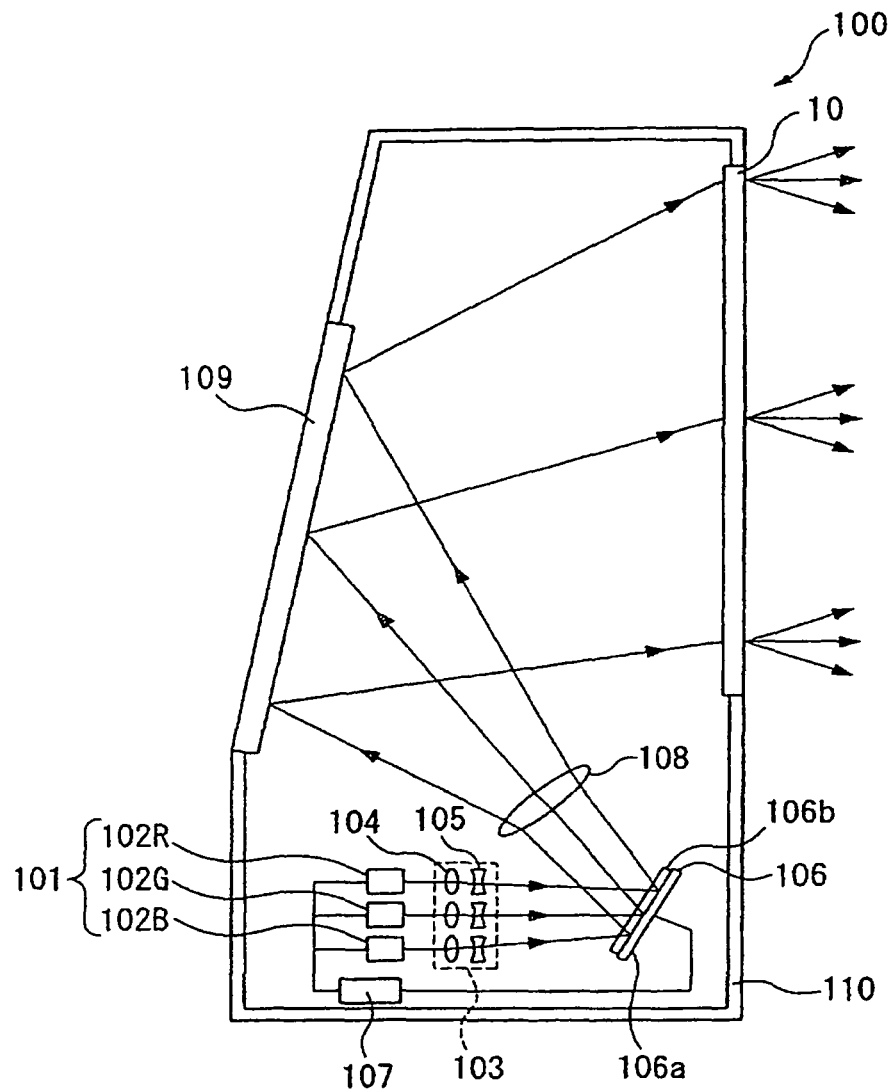
FIG. 11 is a schematic structural view of the image display device according to a fourth embodiment of the invention.

As shown in FIG. 11, an image display device 100 is broadly constituted by a light source device 101 including a laser light source 102R that emits R light, a laser light source 102G that emits G light, and a laser light source 102B that emits B light, a lens optical system 103 that contains a collimating optical system 104 and a beam-adjusting optical system 105, a scanner (scanning unit) 106 that scans incident laser light in a two-dimensional manner, a projection lens 108 that enlarges and projects laser light scanned by the scanner 106, and a reflecting mirror 109 that reflects light projected by the projection lens 108 toward the screen 10. In this image display device 100, the light source device 101, the lens optical system 103, the scanner 106, the projection lens 108, and the reflecting mirror 109 are accommodated in a casing 110 that includes the screen 10, and an image is displayed by scanning the screen 10 with laser light that travels through the casing 110.

Since the image display device according to the invention uses the screen 10 which reduces scintillation while suppressing image blurring, scintillation is suppressed in light emitted from the screen 10. This makes it possible to display a good image with no unevenness in its brightness.

Incidentally, while this embodiment uses screen 10 of the first embodiment, screen 40 of the second embodiment and screen 50 of the third embodiment can also be used. The technical field of the invention is not limited to the foregoing embodiments, it being possible to make various modifications without departing from the spirit or scope of the invention.

For example, since the elastic force of the elastic member need only act in the x-direction and the y-direction within the diffusion plane of the diffusion plate, it is possible to provide a coil spring at the angular parts of the top side of the diffusion plate, and hold the diffusion plate in the casing such that it can oscillate via the coil spring.

Also, while the elastic member (rubber, suspension wire) is here attached to the casing, a frame can be disposed along the outer periphery of the diffusion plate. With this configuration, since the frame holds the diffusion layer with the elastic member therebetween, a screen body that generates vibrations as required can be inserted into the opening of the casing.

While in the configuration described here, antistatic processing is applied to the incidence face and emission face of the diffusion plate, antistatic processing can be applied to the emission face of the Fresnel plate (the surface facing the diffusion plate) and the incidence face of the lenticular plate (the surface facing the diffusion plate). With this configuration, antistatic processing of the emission face of the Fresnel plate and the incidence face of the lenticular plate suppresses electrostatic force generated when the diffusion plate vibrates, enabling the diffusion plate to be moved smoothly.

Instead of antistatic processing, a lubricating resin can be used to form films over the emission face of the Fresnel plate, the incidence face of the lenticular plate, and the incidence and emission faces of the diffusion plate. A lubrication effect can be achieved at the portion where the elastic member (rubber) and the diffusion plate rub together, by using, for at least one of them, polytetrafluoroethylene (PTFE) resin or a metal member whose surface is lubricated.

There is no limitation on the use of a Fresnel plate as described above, and it need only have a refracting effect; for example, a hologram sheet and such like can be used.

Moreover, while a lenticular plate 13 including a plurality of half-cylindrical microlens elements is used here, this is not limitative of the invention; for example, it is possible to use an optical element that includes microlens elements that have approximately circular or approximately elliptical cross-sections, when the lenticular plate is seen in plan view. The optical member needs only to have a light-transmitting plate-like shape; for example, glass and the like can be used.

While laser light sources having high interference are used here as light sources, the effects of the invention can be obtained with coherent light sources such as, for example, high pressure mercury lamps and LEDs.

Furthermore, while light-transmitting liquid crystal light valves are used as light modulation devices, it is also possible to use light-reflecting liquid crystal light valves and micro-mirror array devices as light-modulating elements. In that case, the projection optical system is modified as appropriate.

The screen can be configured such that it vibrates randomly within the x-y plane. By setting the screen such that it is randomly vibrated by the driving unit, scintillation can be reduced.

A black matrix (light-blocking layer) can be arranged on the emission face of the lenticular plate. This configuration effectively prevents laser light condensed by the microlens elements from returning to the incidence side, and efficiently diffuses the laser light from the emission face. A bright and clear image with good contrast can thereby be displayed.

Embodiments of a screen, a rear projector, and an image display device according to the invention will be explained with reference to the drawings. In the drawings below, dimensions of members are changed as appropriate to make them more easily discernible.

Fifth Embodiment

Figure 12A:
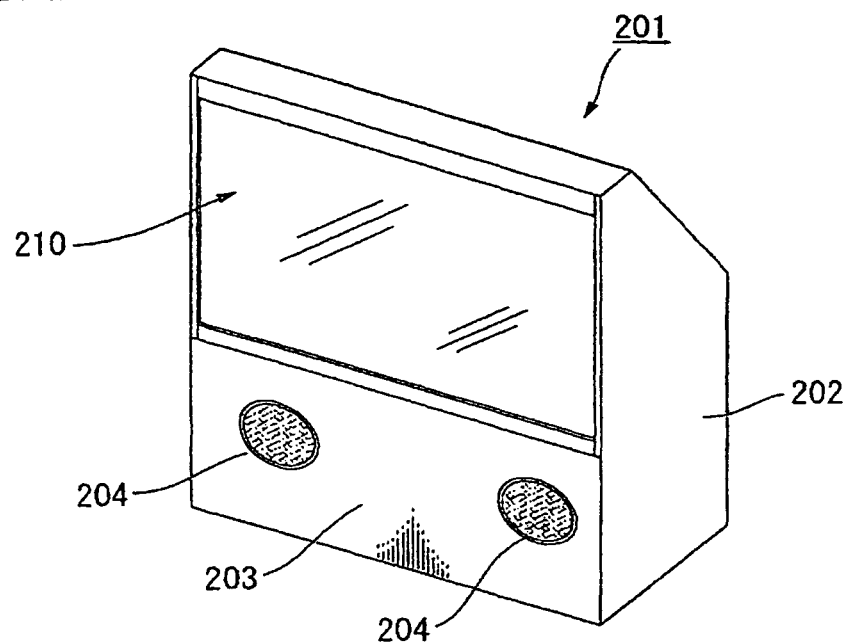
FIGS. 12A and 12B are a perspective view and a side cross-sectional view, respectively, showing the schematic structure of the rear projector according to a fifth embodiment of the invention.
Figure 12B:
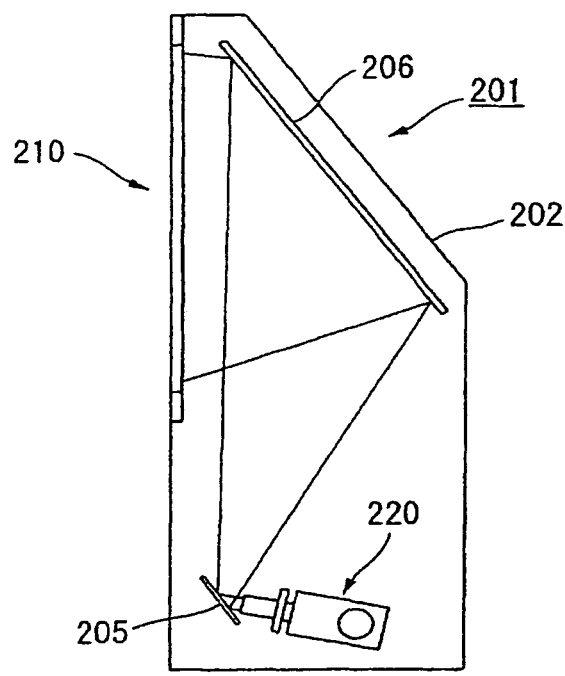

FIG. 12A is a perspective view of a schematic structure of a rear projector (projector) 201 according to this embodiment, and FIG. 12B is a side cross-sectional view of the rear projector 201 shown in FIG. 12A. The rear projector 201 according to this embodiment uses a light-modulating unit to modulate light emitted from a light source device, and projects the modulated light in enlargement onto a screen 210.

As shown in FIG. 12A, the rear projector 201 includes a casing (holding unit) 202, and the screen 210 which is attached to a front face of the casing 202 and which an image is projected onto. A front panel 203 is provided in a portion of the casing 202 below the screen 210, and openings 204 for outputting sound from speakers are provided on left and right sides of the front panel 203.

The internal structure of the casing 202 of the rear projector 201 will be explained.

As shown in FIG. 12B, a projection optical system 220 is arranged at the bottom of the inside of the casing 202 of the rear projector 201. Reflecting mirrors 205 and 206 are provided inside the casing 202, forming an optical path wherein light emitted from the projection optical system 220 is reflected by these mirrors 205 and 206 and reaches the screen 210. Light projected from the projection optical system 220 is enlarged and projected onto the screen 210.

Subsequently, a schematic structure of the projection optical system 220 of the rear projector 201 will be explained.

Figure 13:
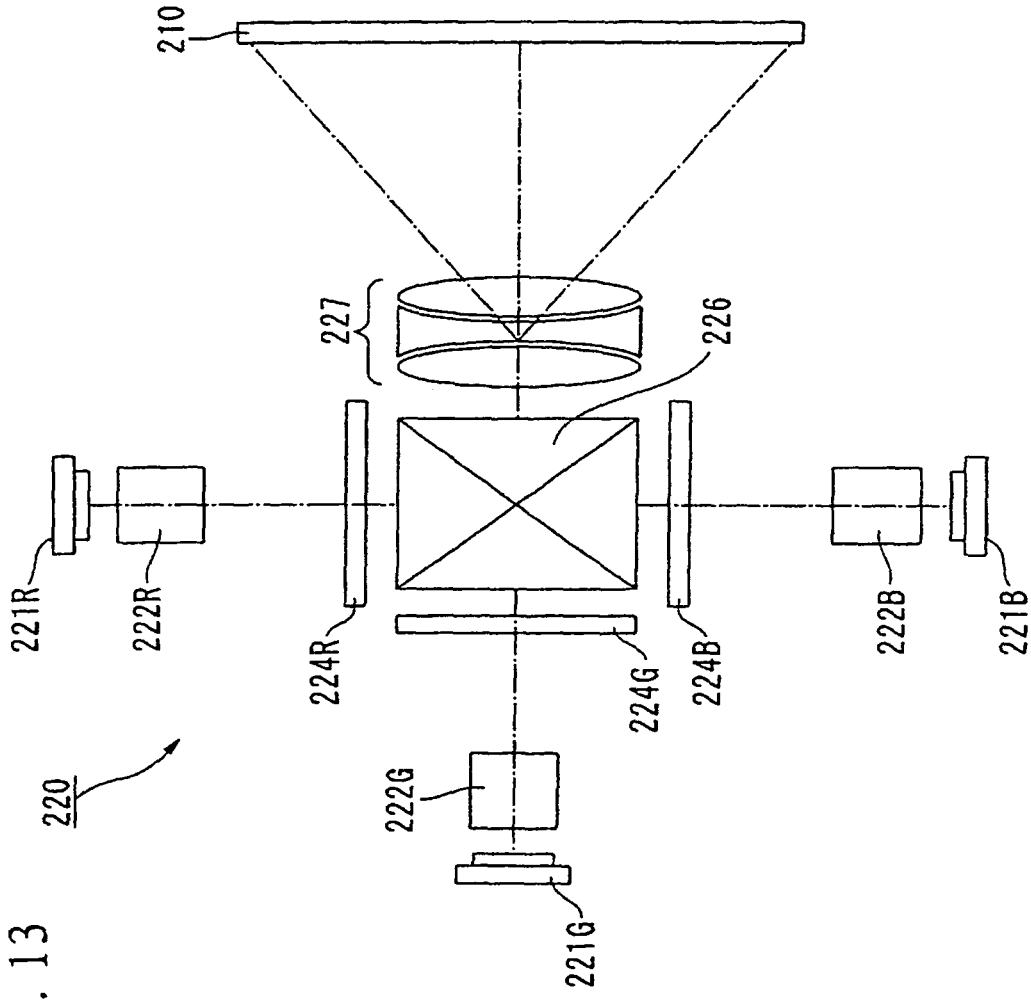
FIG. 13 is a schematic structural view showing the projection optical system and the screen of the rear projector of FIGS. 12A and 12B.

FIG. 13 is a schematic view of the configuration of the projection optical system 220 of the rear projector 201. For simplification, the casing 202 of the rear projector 201 is omitted from FIG. 13.

The projection optical system 220 includes a red laser light source (light source device) 221R, that emits red light, a green laser light source (light source device) 221G that emits green light, a blue laser light source (laser light source) 221B that emits blue light, liquid crystal light valves (light modulation devices) 224R, 224G, and 224B that respectively modulate laser light emitted from the laser light sources 221R, 221G, and 221B, a cross dichroic prism (colored light synthesizing unit) 226 that synthesizes laser lights modulated by the liquid crystal light valves 224R, 224G, and 224B, and a projection lens (projection device) 227 that enlarges and projects the laser light synthesized by the cross dichroic prism 226.

As uniform illumination systems for uniformizing the illuminance distribution of laser lights emitted from the laser light sources 221R, 221G, and 221B, the projection optical system 220 includes illumination optical systems 222R, 222G, and 222B that are arranged in the emission directions of the respective laser light sources 221R, 221G, and 221B, and direct the laser light to the liquid crystal light valves 224R, 224G, and 224B. For example, the illumination optical systems 222R, 222G, and 222B include holograms and field lenses.

Polarization plates (not shown) are provided on incidence sides and emission sides of the liquid crystal light valves 224R, 224G, and 224B. Of the beams from the laser light sources 221R, 221G, and 221B, only light that is linearly polarized in a predetermined direction is transmitted through the incidence side polarization plate, and is incident on the liquid crystal light valves 224R, 224G, and 224B. A polarization conversion unit (not shown) can be provided in front of the incidence side polarization plate. In this case, the polarization conversion unit converts the light such that it is transmitted through the incidence side polarization plate, thereby increasing the light utilization efficiency.

The three colored lights modulated by the liquid crystal light valves 224R, 224G, and 224B are incident at the cross dichroic prism 226. This prism is formed by combining together four right-angled prisms, with dielectric multilayer films for reflecting red light and dielectric multilayer films for reflecting blue light arranged in a cross shape on inner faces thereof. The dielectric multilayer films synthesize the three colored lights, forming light that expresses a color image. The synthesized light is projected onto the screen 210 by the projection lens 227 contained in the projection optical system, and an enlarged image is displayed.

Subsequently, the screen 210 will be explained in detail.

Figure 14:
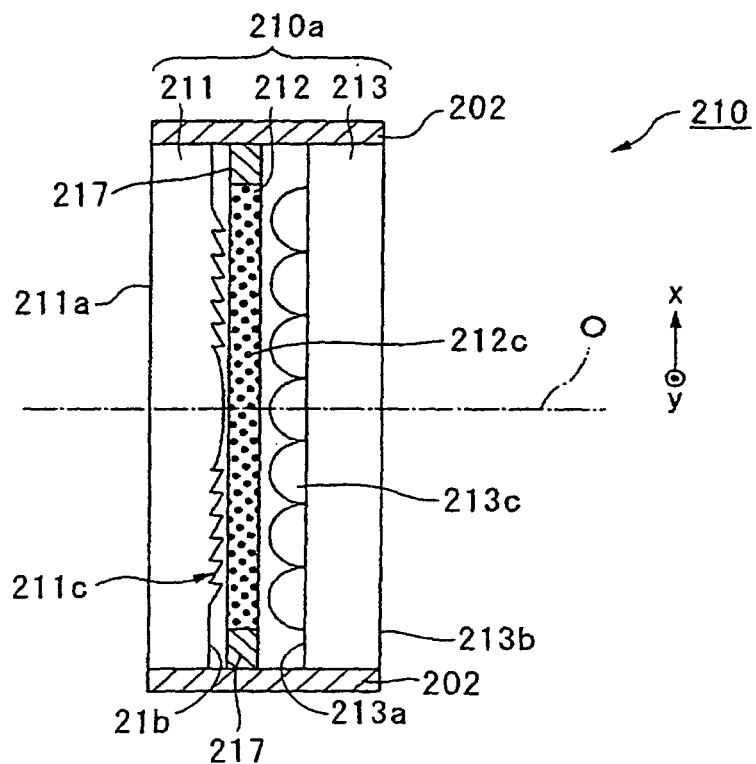
FIG. 14 is a cross-sectional view showing the screen used in the rear projector of FIGS. 12A and 12B.
Figure 16:
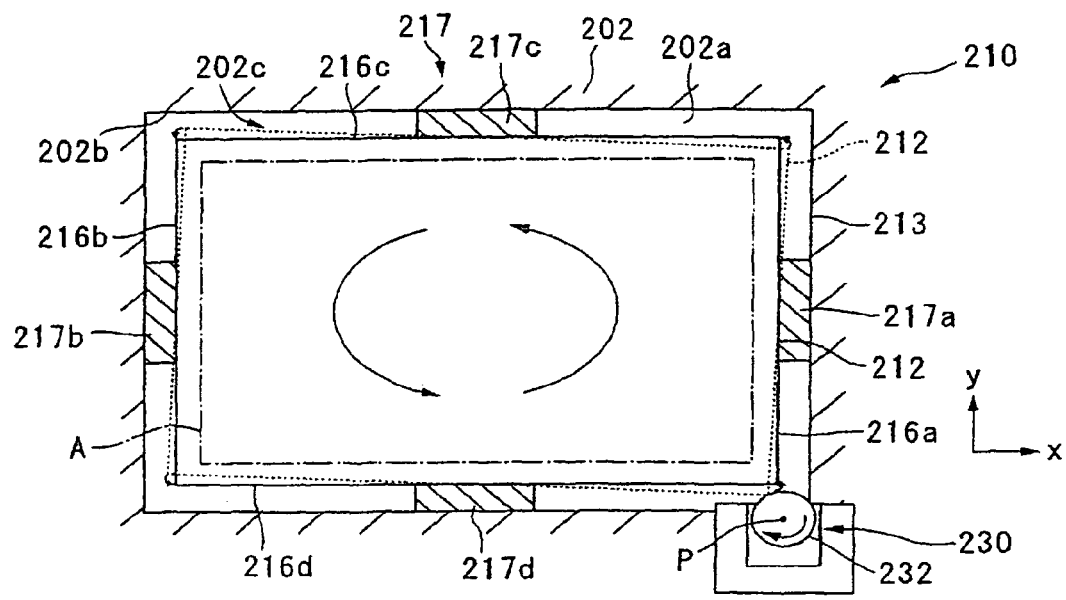
FIG. 16 is a plan view showing the configuration of the screen of the rear projector of FIGS. 12A and 12B.

As shown in FIGS. 14 and 16, the screen 210 includes a screen body 210a, an elastic rubber part (supporting member: elastic member) 217, and a driving unit (actuator) 230.

Firstly, the overall configuration of the screen body 210a will be explained.

Figure 15:
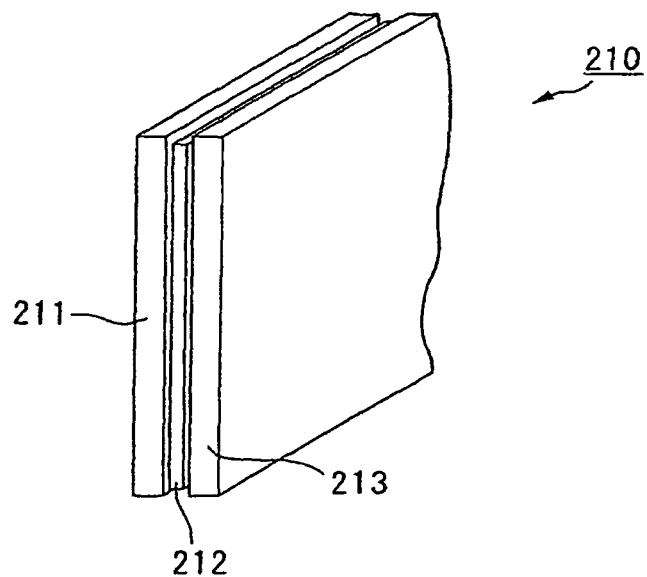
FIG. 15 is a perspective view showing the screen of the rear projector of FIGS. 12A and 12B.

As shown in FIG. 15, the screen body 210a includes a Fresnel plate 221 that converts the angle of incident light, a light-transmitting lenticular plate (diffusion layer) 213, and a diffusion plate (diffusion layer) 212 that is arranged between the Fresnel plate 221 and the lenticular plate 213, and diffuses incident light.

As shown in FIG. 16, an opening 202a is provided in the front face of the casing 202. A gap 202c is provided between an inner wall face 202b of the opening 202a and an outer periphery of the diffusion plate 212.

Subsequently, the rubber part 217 will be explained.

As shown in FIG. 16, the flat plate rubber part 217 is provided along an outer side of an image display region A in a peripheral part of the diffusion plate 212, restricting the movement of the diffusion plate 212 in the optical axis O direction of the incident light while supporting the diffusion plate 212 such that it can oscillate. The rubber part 217 has a plate-like flat shape, and, as shown in FIG. 16, includes a rubber 217a that is provided between an inner face wall 202b of the casing 202 and a right-side face 216a of the diffusion plate 212 such as to fill the gap 202c. Similarly, the rubber part 217 also includes a rubber 217b, a rubber 217c, and a rubber 217d, respectively provided between the inner face wall 202b of the casing 202 and a left-side face 216b of the diffusion plate 212, between the inner face wall 202b of the casing 202 and a top-side face 216c of the diffusion plate 212, and between the inner face wall 202b of the casing 202 and a bottom-side face 216d of the diffusion plate 212. The elastic forces of the rubbers 217a, 217b, 217c, and 217d act in an x-direction (a predetermined direction within the diffusion plane of the diffusion plate: a horizontal direction when the screen is installed) and in a y-direction (a direction that intersects the predetermined direction: a vertical direction when the screen is installed).

The rubbers 217a, 217b, 217c, and 217d are arranged near the centers of the respective faces 216a, 216b, 216c, and 216d. This allows the diffusion plate 212 to be uniformly oscillated within the opening 202a of the casing 202.

While the rubbers here are flat plates, L-shaped rubbers can be arranged at one corner of the diffusion plate 212 and at an opposite corner thereto.

Subsequently, the screen body 210a will be explained in detail.

The Fresnel plate 211 will be explained first.

As shown in FIG. 14, the Fresnel plate 211 includes a prism-shaped Fresnel lens 211c that is formed in an approximately concentric arrangement along an emission face 211b opposite to an incidence face 211a. The Fresnel lens 211c refracts laser light that is emitted from the projection lens 227 and is incident from the incidence face 211a, converts it to parallel light, and emits it from the emission face 211b.

The apexes of protruding sections of the Fresnel lens 211c are chamfered. Alternatively, they can be rounded.

Subsequently, the lenticular plate 213 will be explained.

As shown in FIG. 14, a plurality of half-cylindrical microlens elements 213c are provided in an incidence face 213a of the lenticular plate 213 on the incident side of the laser light. In a flat plane (xy plane) perpendicular to the optical axis O, the longitudinal direction of the plurality of microlens elements 213c is parallel to the y-direction (vertical direction when the screen is installed) and the microlens elements 213c are arranged side-by-side in the x-direction. The apexes of the microlens elements 213c are rounded. Alternatively, they can be chamfered.

The lenticular plate 213 diffuses laser light that is incident from the incidence face 213a within a predetermined angular range and emits the light from the emitting face 213b, widening the view angle of the image and enabling a good image to be observed even if the observer moves in a horizontal direction from the front face of the screen 210 to a position within the predetermined angular range. A light-transmitting material can be used for the lenticular plate 213.

As material for the Fresnel plate 211 and the lenticular plate 213, for example, acrylic resin, polycarbonate resin, thermoplastic resin such as vinyl chloride resin, and cycloolefin resin, and the like, can be used. It is preferable to use a rigid material that transmits light; moreover, surface abrasion-resistance and corrosion-resistance are preferably considered when selecting a material. This ensures high reliability of the Fresnel plate 211 and the lenticular plate 213.

Subsequently, the diffusion plate 212 will be explained.

As shown in FIG. 14, the diffusion plate 212 diffuses laser light emitted from the emission face 211b of the Fresnel plate 211 and emits it toward the incidence face 213a of the lenticular plate 213. Diffusive particles 212c are scattered inside the diffusion plate 212. Specifically, fine particles (beads) of silica, glass, resin, and the like can be used. While there is no restriction on the average particle diameter of the particles 212c, it is preferably between 0.5 μm and 50 μm.

Cycloolefin resin is one example of a material that can be used for the diffusion plate.

Figure 17:
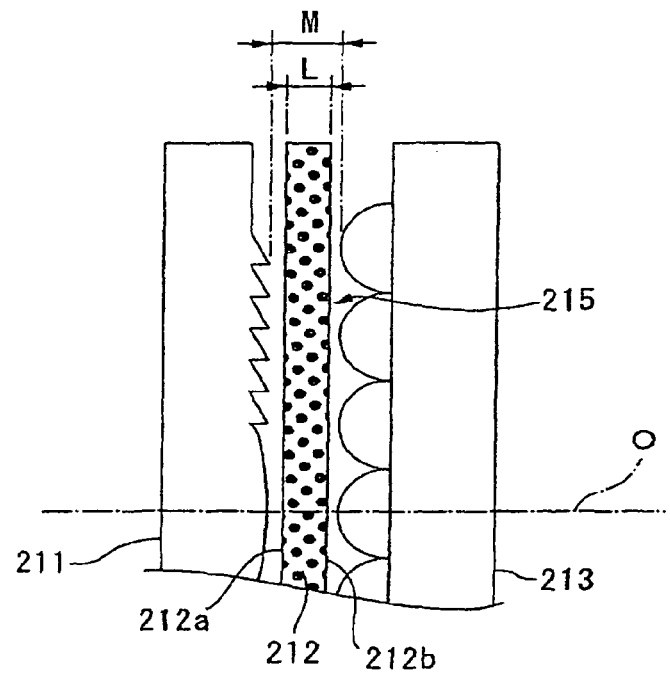
FIG. 17 is a cross-sectional view showing the screen of the rear projector of FIGS. 12A and 12B.

As shown in FIG. 17, the thickness L of the diffusion plate 212 is approximately two-thirds of the interval M of a gap 215 between the Fresnel plate 211 and the lenticular plate 213. The thickness L of the diffusion plate 212 is preferably greater than half of the interval M of the gap 215. With this configuration, the diffusion plate 212 does not bend significantly, since it does not deviate in the direction of the optical axis O between the Fresnel plate 211 and the lenticular plate 213 by an amount equivalent to its thickness L.

That is, by moving the diffusion plate 212 within the gap 215 which is wider than the thickness L of the diffusion plate 212 at a difference below a predetermined width, the diffusion plate 212 does not deviate more than a predetermined distance in the focusing direction, and consequently the image is not disrupted by focal blurring. Furthermore, since the gap 215 can restrict the movement of the diffusion plate 212, the diffusion plate 212 can be moved while tensing it such that it does not bend, without using a holding member to hold the diffusion plate 212 even if it is thin (e.g., thickness: 0.5 mm, size: several tens of inches).

Since this allows the mass of the diffusion plate 212 to be reduced, the diffusion plate 212 can be moved easily; in addition, the entirety of the screen 210 can be made smaller.

The incidence face (the face opposite the Fresnel plate) 212a and the emission face (the face opposite the lenticular plate) 212b of the diffusion plate 212 shown in FIG. 17 are processed to prevent static.

The Fresnel plate 211, the lenticular plate 213, and the diffusion plate 212 are made from a plastic material such as acrylic resin. This reduces the overall weight of the screen 210. It is particularly important to reduce the weight of the diffusion plate 212, since it is a vibrating member. However, when a plastic material is used to form the diffusion plate 212, static electricity is generated and becomes a large resisting force when the diffusion plate 212 vibrates. The resistance generated by static electricity at this time can be reduced by applying antistatic processing to the incidence face 212a and the emission face 212b of the diffusion plate 212. As the method of antistatic processing, an antistatic processing agent may be mixed in the plastic material, or the antistatic processing agent may be applied on the faces.

Subsequently, the driving unit 230 will be explained.

As shown in FIG. 16, the screen 210 includes a driving unit 230 that rotates, thereby oscillating the diffusion plate 212. Specifically, the driving unit 230 is provided at the bottom face 216d side of the diffusion plate 212, and makes the diffusion plate 212 oscillate parallel to its emission face (diffusion face) 212b via the rubber part 217. The driving unit 230 operates intermittently, and vibrates the diffusion plate 212 continuously. The driving unit 230 continuously vibrates the diffusion plate 212 in a direction parallel to the emission face 212b that diffuses the laser light (xy plane direction), i.e., a direction perpendicular to the optical axis O of the laser light shown in FIG. 14. The frequency at which the diffusion plate 212 is vibrated is set higher than a flicker frequency visible to the human eye.

As shown in FIG. 16, the driving unit 230 includes a disk-shaped driving plate 232 that rotates clockwise around a central axis P. As shown by the broken line in FIG. 16, the diffusion plate 212 can contact the disk-shaped driving plate 232. When the face 216d of the diffusion plate 212 contacts the driving plate 232, it is pushed in the rotational direction and the diffusion plate 12 oscillates along a circular path.

The diffusion plate 212 can also be moved along an elliptical path, or along an 8-shaped path.

Subsequently, a method of projecting an image onto the screen 210 using the rear projector 201 of this embodiment having the above configuration will be explained.

As shown in FIG. 13, the illuminance distribution of laser lights emitted from the laser light sources 221R, 221G, and 221B is made to have approximately uniform illuminance distribution by the illumination optical systems 222R, 222G, and 222B, and the lights are then incident on the liquid crystal light valves 224R, 224G, and 224B. The incident laser lights are modulated by the liquid crystal light valves 224R, 224G, and 224B, and are incident on the cross dichroic prism 226. The cross dichroic prism 226 then synthesizes R light, G light, and B light modulated respectively by the liquid crystal light valves 224R, 224G, and 224B. Light synthesized by the cross dichroic prism 226 is projected onto the screen 210 by the projection lens 227.

Figure 18:
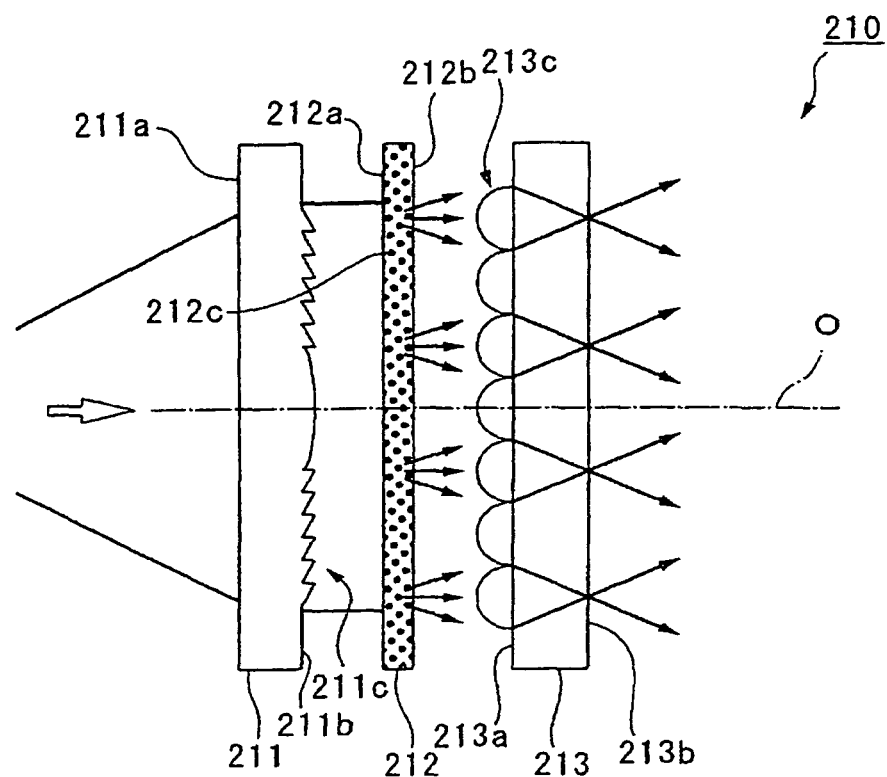
FIG. 18 is a cross-sectional view schematically showing the laser light transmitted through the screen of the rear projector of FIGS. 12A and 12B.

As shown schematically in FIG. 18, laser light projected onto the screen 210 is incident from the incidence face 211a of the Fresnel plate 211, by which it is refracted and becomes collimated light. The collimated light emitted from the emission face 211b of the Fresnel plate 211 is diffused by the diffusion plate 212 in random directions, and the diffused lights are incident on the incidence face 213a of the lenticular plate 213. Light emitted from the lenticular plate 213 is diffused over a predetermined angular range. As shown in FIG. 16, when the diffusion plate 212 contacts the driving plate 232, the diffusion plate 212 is pushed upward in conjunction with the rotational of the driving plate 232 and subsequently moves away from the driving plate 232. That is, the force supplied to the diffusion plate 212 is transmitted to the rubber 217c on the top-side face 216c, repelled by the inner wall face 202b of the casing 202, and transmitted once again to the diffusion plate 212 by the elasticity of the rubber 217c. Since the force supplied to the diffusion plate 212 is simultaneously transmitted to the rubbers 217b, 217c, and 217d, the diffusion plate 212 oscillates along the circular path shown in FIG. 16.

Subsequently, the diffusion plate 212, after the oscillation attenuates by a predetermined amount, contacts the driving plate 232, as shown in FIG. 16 by a dotted-line rectangle, and thereby is pushed upward once again.

In the screen 210 of the rear projector 201 according to this embodiment, the rubber part 217 ensures that the diffusion plate 212 oscillates in the direction perpendicular to the optical axis O of light which is incident upon it, whereby the diffusion plate 212 does not move in the optical axis O direction. Therefore, it becomes possible to suppress generation of image blurring caused by fluctuation in the focal point, and to display a clear image.

Furthermore, since the rubber part 217 supports the diffusion plate 212 in the peripheral part of the outer side of the image display region A, the diffusion plate 212 can be restricted from moving in the optical axis O direction without affecting the displayed image, enabling a clear image to be displayed.

In addition, since the driving unit 230 continuously makes the diffusion plate 212 oscillate, it has no dead point (a point where it stops moving at least a moment), ensuring that there is not a slightest moment of interference. Therefore, an effect of suppressing speckling of light emitted from the screen body 210a can be continuously achieved.

The driving plate 232 can be moved continuously, making the driving unit 230 easier to control, or it can be moved intermittently as in this embodiment, enabling power consumption to be reduced.

While rubber is used here as an elastic member, any elastic member such as silicone and foam material is acceptable; for example, a coil spring and a leaf spring can be used.

Figure 19:
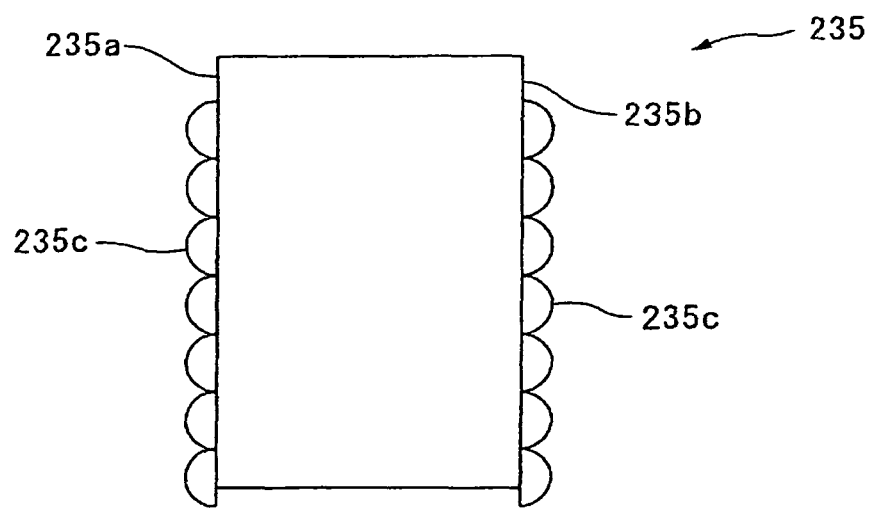
FIG. 19 is a cross-sectional view showing the modification of the diffusion plate of the screen of the rear projector of FIGS. 12A and 12B.

While in this embodiment diffusive particles are scattered inside the diffusion plate 212, a diffusion plate (diffusion member) 235 can include a plurality of bumps 235c on its incidence face 235a and its emission face 235b as shown in FIG. 19. In this configuration, light that is incident on the diffusion plate 235 is diffused by the plurality of bumps 235c, whereby the configuration is simpler and laser light that is incident on the diffusion plate 235 can be made diffusive. While incident laser light can be diffused even if the plurality of bumps 235c are only formed on at least one of the incidence face 235a and the emission face 235b, the incident laser light is more effectively diffused if the bumps 235c are provided on both the incidence face 235a and the emission face 235b.

Sixth Embodiment

Subsequently, a sixth embodiment of the invention will be explained with reference to FIG. 20. In the descriptions of each of the subsequent embodiments, elements which are common to the configuration of the screen 210 of the rear projector according to the fifth embodiment mentioned above are represented by the same reference symbols, and are not repetitiously explained.

A screen 240 according to this embodiment differs from the fifth embodiment in regard to the configuration of a driving unit (driving unit: actuator) 245 that performs a reciprocating movement.

The driving unit 245 includes a solenoid 247 that is driven by a movable unit 246 using electromagnetic power. The movable unit 246 is arranged inside a coil (not shown), and moves directly forward by an application of current to the coil. The solenoid 247 is tilted at approximately 45° with respect to a bottom face 212d of a diffusion plate 212, and the movable unit 246 thrusts the bottom face 212d of the diffusion plate 212 upward at 45°.

The diffusion plate 212 is suspended from above by an elastic suspension wire (supporting member: expandable member) 241 near the center of its top side (one side). The suspension wire 241 is provided outside the image display region A in a peripheral part of the diffusion plate 212. Moreover, the diffusion plate 212 is allowed freedom to move considerably, except at the supporting point of the suspension wire 241.

A method of projecting laser light onto the screen 240 is the same as that of the fifth embodiment, and only the screen 240 will be explained here.

Figure 20:
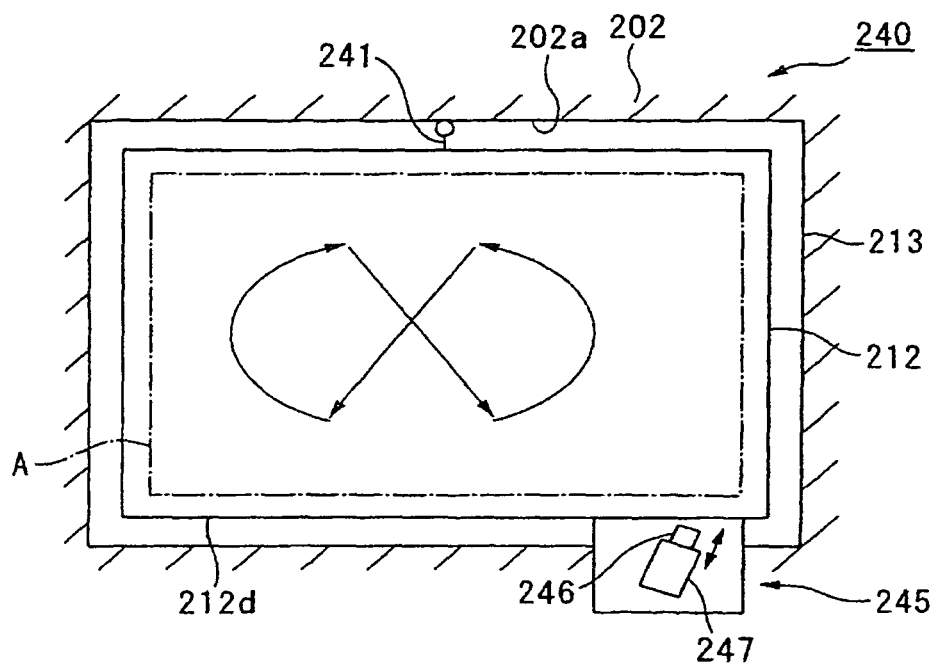
FIG. 20 is a plan view of the screen according to a sixth embodiment of the invention.

The solenoid 247 makes the movable unit 246 apply a force that thrusts the bottom face 212d of the diffusion plate 212 upward at 45°, whereby, as shown in FIG. 20, the diffusion plate 212 moves along an 8-shaped path. Due to the elasticity of the suspension wire 241, the movement of the diffusion plate 212 attenuates in a predetermined period of time while it continues to vibrate along the 8-shaped path. The solenoid 247 does not apply force to the diffusion plate 212 while the diffusion plate 212 is continuing to vibrate along this 8-shaped path. When the attenuation reaches a predetermined amount, the solenoid 247 starts operating again and pushes the diffusion plate 212 upward at 45°.

In the screen 240 of the rear projector according to this embodiment, since the diffusion plate 212 is vibrated by the solenoid 247 and suspended by the elastic suspension wire 241, it need not be driven constantly. This achieves continuous operation efficiently, without consumption of excess energy, and can reduce scintillation of laser light emitted from the screen 240. Also, since the solenoid 247 is small, the overall size of the screen 240 can be reduced.

While the suspension wire 241 is used here as an expandable member, it is equally acceptable to use an expandable film, a rubber string, a flat rubber, a coil spring, etc. While one suspension wire 241 is described here, a plurality of them may be provided. When using a plurality of suspension wires, the diffusion plate 212 is stably held in the opening 202a of the casing 202.

Seventh Embodiment

Subsequently, a seventh embodiment of the invention will be explained with reference to FIGS. 21A, 21B, and 21C.

A screen 250 according to this embodiment differs from the fifth embodiment with regard to the configuration of a driving unit (driving unit: actuator) 251 that performs a rotational operation, and in that the diffusion plate 212 is supported by a supporting unit (supporting member) 255 instead of by the rubber part 217.

Figure 21A:
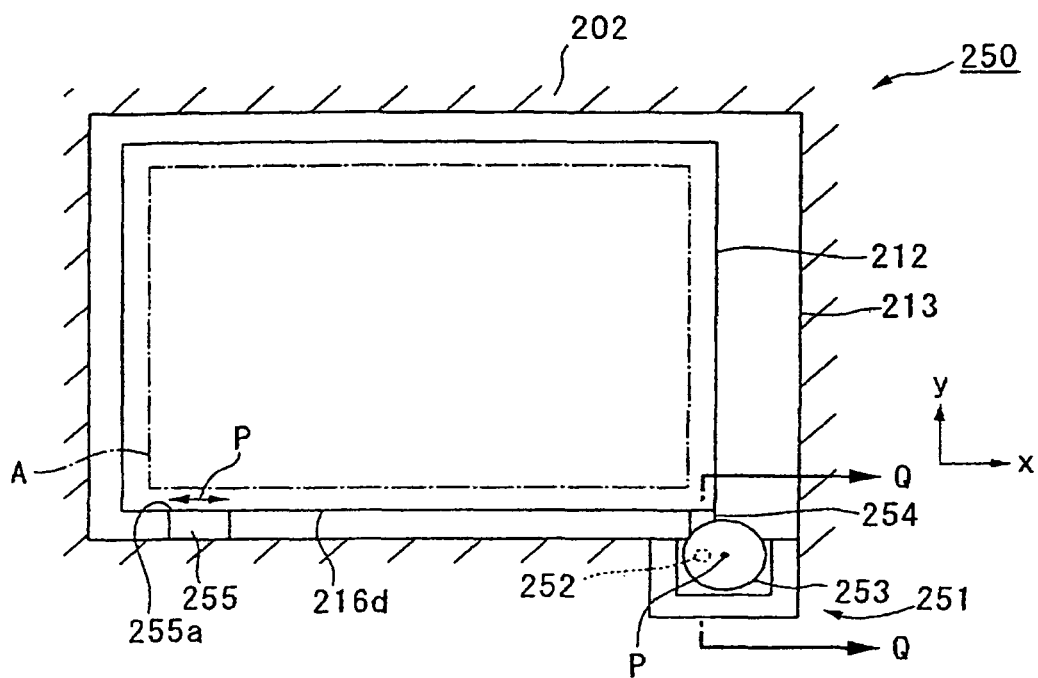
FIGS. 21A to 21C are, respectively, a plan view, a perspective view of the driving unit, and a perspective view of the support unit, of the screen according to a seventh embodiment of the invention.
Figure 21B:
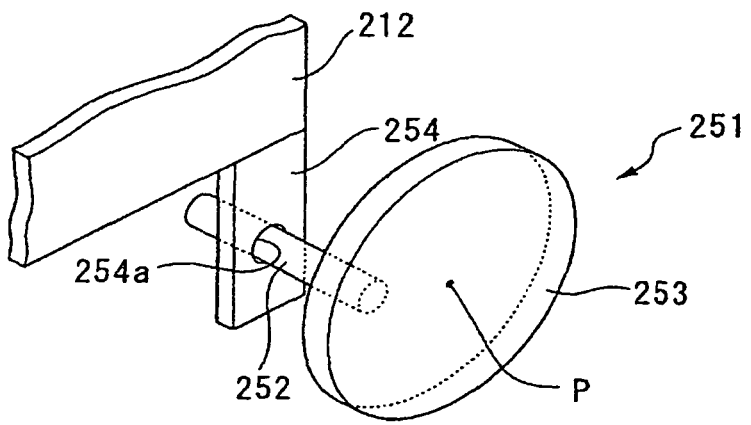
Figure 21C:
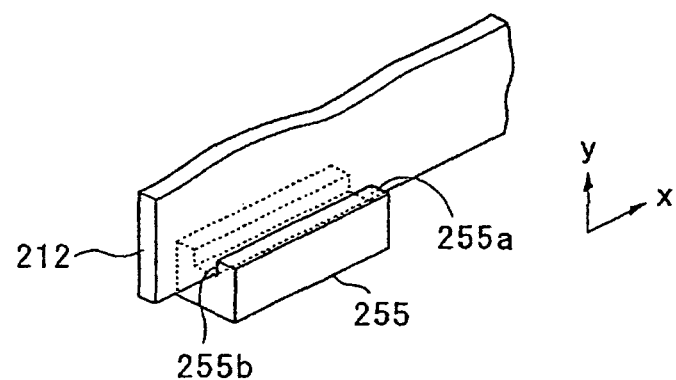

As shown in FIG. 21A, the driving unit 251 includes an eccentric shaft 252, a driving plate 253, and a connector (connecting member) 254.

A motor (not shown) rotates the driving plate 253 around a pivot P. The eccentric shaft 252 is attached on the driving plate 253 at a position away from the pivot P.

The connector 254 is provided at the right bottom side of the diffusion plate 212, and is connected to the diffusion plate 212. As shown in FIG. 21B, a hole 254a whose diameter is approximately the same as that of the eccentric shaft 252 is formed in the connector 254, and the eccentric shaft 252 is inserted through this hole 254a.

A supporting part 255 is provided on a bottom side face 216d on the left side of the outer side of the image display region A, and the diffusion plate 212 is mounted on a top face 255a. As shown specifically in FIG. 21C, a groove 255b is arranged on the top face 255a of the supporting part 255 along the longitudinal direction (x-direction) of the face 216d. The depth of the groove 255b is such that the diffusion plate 212 does not slip out from the groove 255b when it oscillates along a circular path. That is, the depth of the groove 255b is determined according to the position of the eccentric shaft 252 attached to the driving plate 253. This allows the diffusion plate 212 to move (slide) along the inside of the groove 255b, while its movement in the optical axis O direction of the incident light can be restricted and the diffusion plate 212 can be supported such that the diffusion plate 212 can oscillate.

With these configurations, when the driving unit 251 is operated, the driving plate 253 rotates around the pivot P, and, in conjunction with the rotational of the driving plate 253 as shown in FIG. 21A, the connector 254 rotates around the pivot P while holding the diffusion plate 212 in place on the top side of the connector 254 via the eccentric shaft 252. The driving force from the driving unit 251 is thereby continuously transmitted to the diffusion plate 212, which moves along a circular path with a radius corresponding to the eccentricity amount of the eccentric shaft 252, while being restricted by the groove 255b of the supporting part 255 from moving along the optical axis O. The diffusion plate 212 can also be moved along an elliptical path, and the diffusion plate 212 may be moved along an 8-shaped path.

In the screen 250 of the rear projector according to this embodiment, since the diffusion plate 212 is allowed to oscillate by the connector 254 attached to the driving unit 251, the driving force from the driving unit 251 is transmitted via the connector 254 to the diffusion plate 212, making it easier to oscillate the diffusion plate 212.

By providing the supporting part 255 on the bottom side face 216d of the diffusion plate 212 outside the image display region A, the diffusion plate 212 can be prevented from moving in the optical axis O direction with a simple configuration.

Furthermore, the supporting part 255 allows the diffusion plate 212 to move freely in the arrowed direction indicated by letter P in FIG. 21A, while making it possible to restrict the movement of the diffusion plate 212 in the optical axis O direction. Therefore, scintillation and generation of image blurring caused by fluctuation of the focusing point can both be suppressed, enabling a clear image to be displayed.

The diffusion plate 212 and the connector 254 can be formed in a single piece. Alternatively, the diffusion plate 212 can be securely sandwiched on each side by portions of the connector 254.

Figure 22:
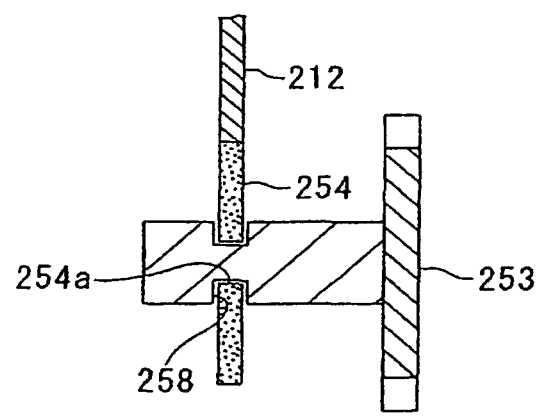
FIG. 22 is a cross-sectional view showing the modification of the driving unit of the screen of FIGS. 21A to 21C.

While, in the above embodiment, the hole 254a is provided in the connector 254 as explained above, an alternative configuration is also possible, in order to more reliably restrict the movement of the diffusion plate 212 in the optical axis O direction. That is, as shown in FIG. 22, which is a cross-sectional view taken along the line Q-Q of FIG. 21A, a groove 258 whose width is approximately the same as the thickness of the diffusion plate 212 can be formed in the eccentric shaft 252, the connector 254 being inserted into this groove 258. Since this configuration restricts the movement of the diffusion plate 212 in the optical axis O direction on both its right and left sides, the connector 254 can further prevent the diffusion plate 212 from moving in the focusing direction.

Eighth Embodiment

Subsequently, an eighth embodiment of the invention will be explained with reference to FIGS. 23A and 23B.

A screen 260 according to this embodiment differs from the seventh embodiment in regard to the configuration of a supporting part 261.

Figure 23A:
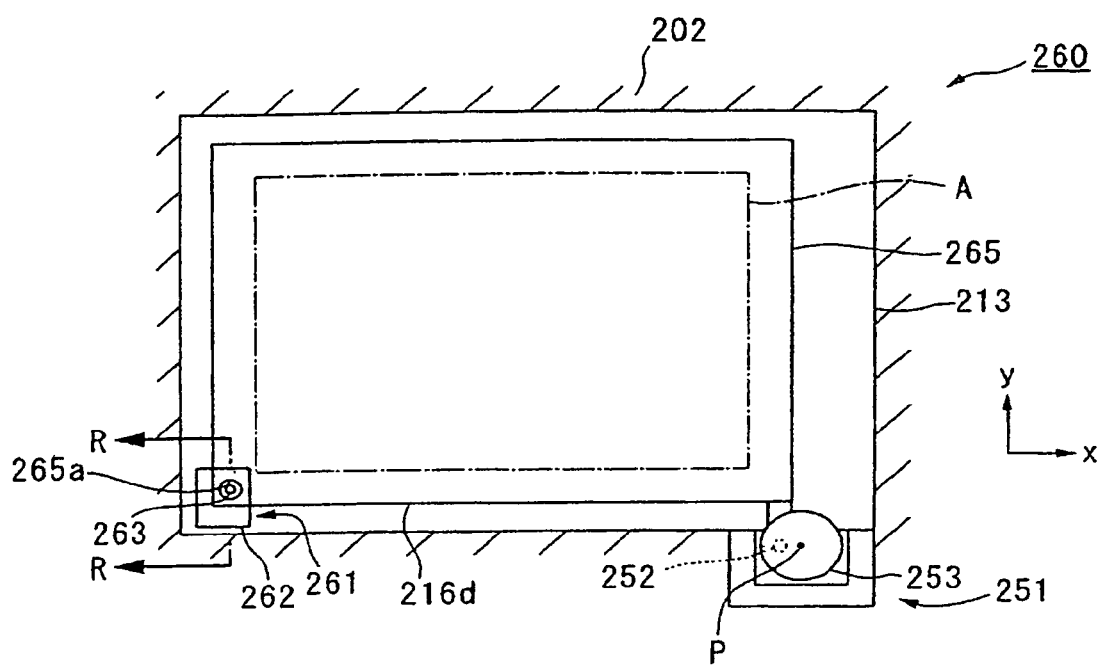
FIGS. 23A and 23B are, respectively, a plan view, and a cross-sectional view of the support unit, of the screen according to an eighth embodiment of the invention.
Figure 23B:
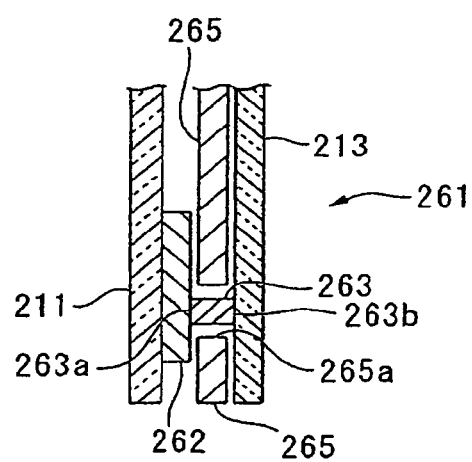

As shown in FIG. 23A, a supporting part (supporting member) 261 is provided at a bottom left side of an outer side of the image display region A, and, as shown in FIG. 23B, includes a supporting plate 262 attached to a Fresnel plate 211, and a circular column-like projecting part 263 having one side face 263a that is affixed to the supporting plate 262. Another side face 263b of the projecting part 263 is affixed to a lenticular plate 213.

As shown in FIG. 23A, a hole 265a is provided at the bottom left side of a diffusion plate 265, and is large enough to allow the diffusion plate 265 to move in the x-direction and the y-direction. In the state shown in FIG. 23B, the projecting part 263 is inserted through the hole 265a. This configuration restricts the movement of the diffusion plate 265 in the optical axis O direction of incident light when it oscillates along a circular path while supporting the diffusion plate 265 such that it can freely oscillate within the xy plane, thereby ensuring that the diffusion plate 265 does not bend.

In the screen 260 of the rear projector according to this embodiment, the supporting part 261 allows the diffusion plate 265 to move freely within the plane while enabling its movement in the optical axis O direction to be restricted. Therefore, generation of image blurring caused by fluctuation of the focusing point can be suppressed, and a clear image can be displayed.

Instead of using the supporting plate 262, the Fresnel plate 211 and the lenticular plate 213 can be connected by the circular column-like projecting part 263.

Instead of forming the hole 265a in the diffusion plate 265, the projecting part 263 can be secured to the diffusion plate 265 on the outer side of the image display region A. In this configuration, while the point on the diffusion plate 265 where the projecting part 263 is connected becomes the dead point (a point where it stops moving at least a moment), since the diffusion plate 265 continues oscillating in the image display region A, scintillation can be continuously reduced.

Ninth Embodiment

Subsequently, a ninth embodiment of the invention will be explained with reference to FIG. 24.

The basic configuration of a screen 270 according to this embodiment is similar to that of the fifth embodiment, differing in that a lenticular plate 213 is not used and a screen body 270a has a two-layer structure.

The screen body 270a includes a Fresnel plate 271, and a diffusion plate (diffusion layer) 272 similar to that of the fifth embodiment.

Figure 24:
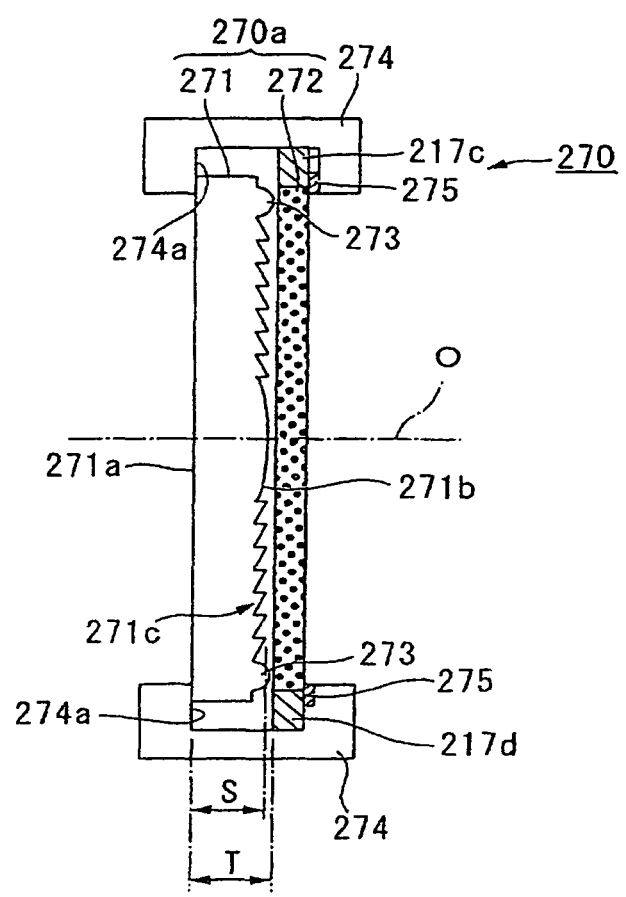
FIG. 24 is a cross-sectional view of the screen according to a ninth embodiment of the invention.

In the Fresnel plate 271 shown in FIG. 24, a contacting part 273 is arranged along the outer periphery of a surface facing the diffusion plate 272, i.e., an emission face 271b on which a Fresnel lens 271c is disposed. The contacting part 273 should have a smooth shape; in this embodiment it is rounded. The thickness T from an incidence face 271a of the Fresnel plate 271 to the tip of the contacting part 273 of the emission face 271b is greater than the thickness S from the incidence face 271a of the Fresnel plate 271 to the emission face 271b where the Fresnel lens 271c is disposed. Thus, since the Fresnel plate 271 contacts the diffusion plate 272 at the contacting part 273, this configuration ensures that the sharp portions at the apexes of the protruding sections of the Fresnel lens 271c do not contact the diffusion plate 272.

The screen body 270a is fitted with a restricting member 274 for restricting the movement of the diffusion plate 272 in the optical axis O direction (the direction perpendicular to the diffusion plane of the diffusion layer). The restricting member 274 is disposed along the outer peripheries of the Fresnel plate 271 and the diffusion plate 272. In the cross-sectional view, the restricting member 274 includes at its center an indented section 274a into which the Fresnel plate 271 and the diffusion plate 272 are inserted.

A rubber 275 is provided on an inner side face of the indented section 274a of the restricting member 274 on the diffusion plate 272 side. The rubber 275, the diffusion plate 272, and the Fresnel plate 271 are inserted into the indented section 274a, whereby the screen body 270a is held by the restricting member 274 with the rubber 275 therebetween. This reliably restricts the movement of the diffusion plate 272 in the optical axis O direction.

Since the screen 270 of the rear projector according to this embodiment includes the restricting member 274, the diffusion plate 272 is restricted from moving in the optical axis O direction of the incident light. This can reliably suppress generation of image blurring caused by fluctuation of the focal point when the diffusion plate 272 is oscillated, enabling a clearer image to be displayed.

Since the contacting part 273 prevents the sharp portions at the apexes of the protruding sections of the Fresnel lens 271c from contacting the diffusion plate 272, the diffusion plate 272 is prevented from being damaged. Also, since the contacting part 273 is rounded, abrasions caused when the Fresnel plate 271 contacts the diffusion plate 272 can be suppressed.

The contacting part 273 can be chamfered instead of rounded. While the contacting part 273 is here provided around the outer periphery of the Fresnel plate, the protruding part of the central part of the Fresnel plate 271 can be used as a contacting part. Similarly in this case, the thickness from the incidence face 271a of the Fresnel plate 271 to the protruding part of the central part of the emission face need only be greater than the thickness S from the incidence face 271a of the Fresnel plate 271 to the face of the emission face 271b where the Fresnel lens 271c is disposed.

While the diffusion plate 272 is here provided on the emission face 271b side (observer side) of the Fresnel plate 271, it can be provided on the incidence face 271a side of the Fresnel plate 271.

While this embodiment uses the rubber 275, any elastic member is acceptable, it being possible to use a coil spring and the like. The rubber 275 can be provided in the indented section 274a of the restricting member 274 between the Fresnel plate 271 and the diffusion plate 272.

It is preferable to lubricate the sliding faces of the Fresnel plate 271 and the diffusion plate 272 and the contacting faces of the diffusion plate 272 and the restricting member 274 when the diffusion plate 272 oscillates. While this can be achieved by wet lubrication, a process such as dry fluorination is more effective since there is less likely to be seepage to the outside. A lubrication effect can be achieved at portions such as those where the diffusion plate 272 and the Fresnel plate 271 rub together, by using, for at least one of those two members, polytetrafluoroethylene (PTFE) resin or a metal member whose surface is lubricated.

The rubber 275 need not be used if the Fresnel plate 271 and the diffusion plate 272 are highly precise, and if no image burring is caused by moving the diffusion plate 272 in the optical axis O direction (focusing direction).

Tenth Embodiment

Subsequently, a tenth embodiment of the invention will be explained with reference to FIG. 25.

A screen 280 according to this embodiment differs from the fifth embodiment in that, instead of a rubber part (supporting member) 217, it includes a securing part (supporting member) 281 that restricts the movement of the diffusion plate 212, and that the Fresnel plate 271 of the ninth embodiment is used as a Fresnel plate 284.

Figure 25:
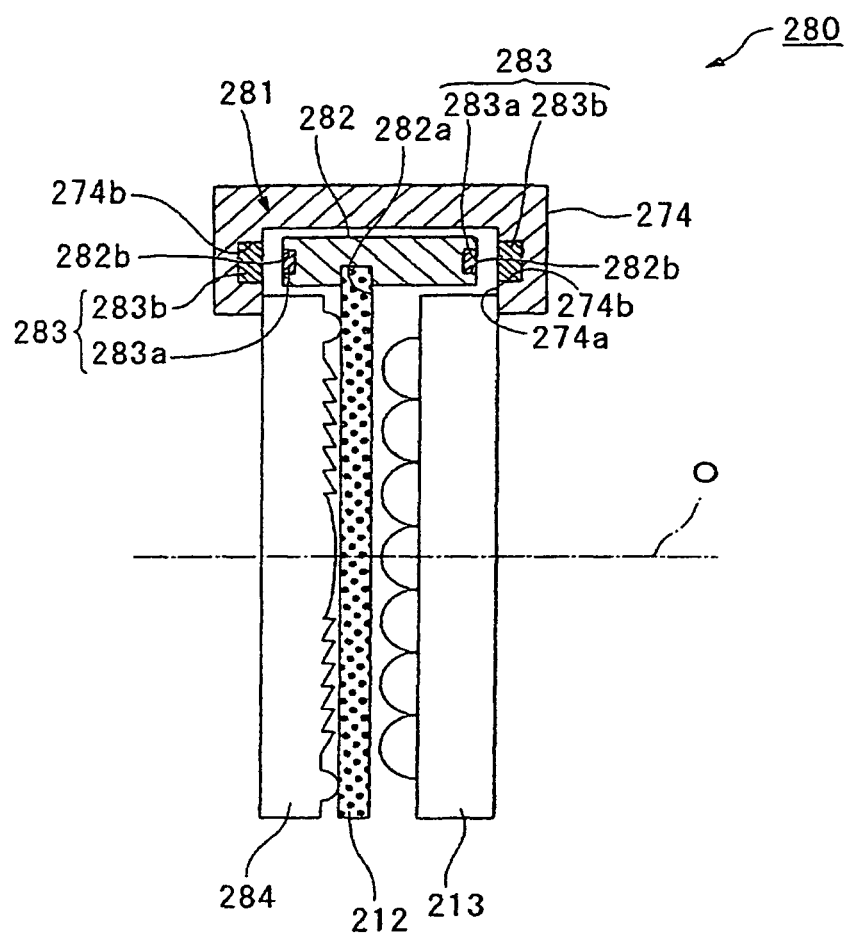
FIG. 25 is a cross-sectional view of the screen according to a tenth embodiment of the invention.

As shown in FIG. 25, the securing part 281 includes a securing plate 282 having a groove 282a into which the diffusion plate 212 is inserted, and two pairs of magnets 283. The securing part 281 is disposed in an indented part 274a of a restricting member 274 with a predetermined interval therebetween.

The magnets 283 include first magnets 283a and second magnets 283b that repulse each other along the optical axis O. The first magnets 283a are inserted in grooves 282b provided in faces of the securing plate 282 that are perpendicular to the optical axis O, and the second magnets 283b are inserted in grooves 274b provided in faces of the restricting member 274 that are perpendicular to the optical axis O. The first magnets 283a and the second magnets 283b consequently hold the diffusion plate 212, which is inserted into the securing plate 282, in a predetermined position in the optical axis O direction, at a predetermined interval along the optical axis O. That is, the repulsive forces of both pairs of magnets 283 balance each other.

In the screen 280 of the rear projector according to this embodiment, the first magnets 283a and the second magnets 283b restrict the movement of the diffusion plate 212 in the optical axis O direction. Using this repulsive force to restrict the movement of the diffusion plate 212 gives the diffusion plate 212 greater freedom to oscillate perpendicular to the optical axis O, enabling the diffusion plate 212 to be effectively oscillated with a simple configuration.

The securing plate 282 can be constituted by the first magnets 283a. Instead of the repulsive force of the magnets 283, the restricting member 274 and the securing plate 282 can be made mutual repulsive by electrostatic force.

Figure 26:
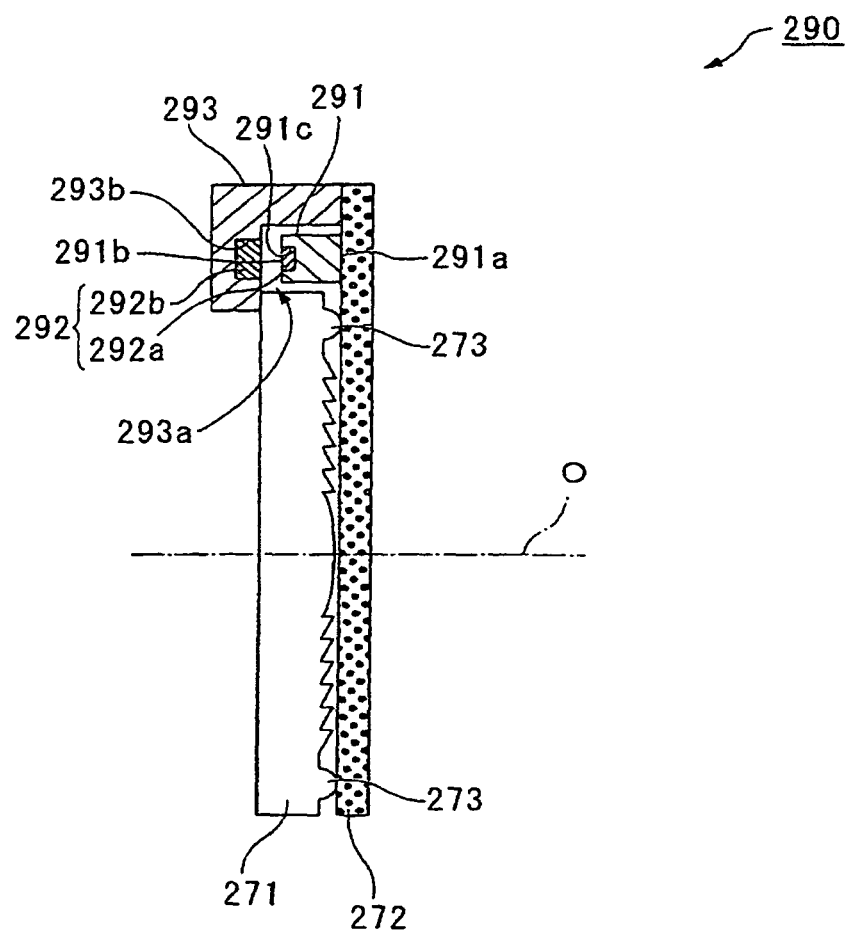
FIG. 26 is a cross-sectional view showing the modification of the screen of FIG. 25.

Moreover as shown in FIG. 26, when a screen 290 has a two-layer structure including the Fresnel plate 271 of the ninth embodiment and the diffusion plate 272, it becomes possible to use a securing plate (supporting member) 291 and magnets 292. That is, the attracting forces of a first magnet 292a and a second magnet 292b restrict the movement of the diffusion plate 272 in the optical axis O direction.

Specifically, the securing plate 291 is disposed in a space 293a between the restricting member 293 which is L-shaped in a cross-section and the diffusion plate 272, leaving a predetermined interval therebetween. An end face 291a of the securing plate 291 that is perpendicular to the optical axis O is then affixed to the diffusion plate 272, and the first magnet 292a is disposed in a groove 291c provided in another end face 291b that is opposite to the end face 291a. The second magnet 292b is securely inserted into a groove 293b provided in a face of the restricting member 293 that is perpendicular to the optical axis O direction. Although the attracting forces of the first magnet 292a and the second magnet 292b pull the diffusion plate 272 to the Fresnel plate 271 side, due to the contacting part 273, the first magnet 292a and the second magnet 292b, which are disposed along the optical axis O direction with a predetermined interval therebetween, hold the diffusion plate 272 in a predetermined position in the optical axis O direction. With this configuration, since one pair of magnets 292 restricts the movement of the diffusion plate 272 in the optical axis O direction, the number of components can be reduced.

Eleventh Embodiment

Subsequently, an eleventh embodiment of the invention will be explained with reference to FIG. 27.

According to this embodiment, the screen 210 of the fifth embodiment is applied in an image display device.

Figure 27:
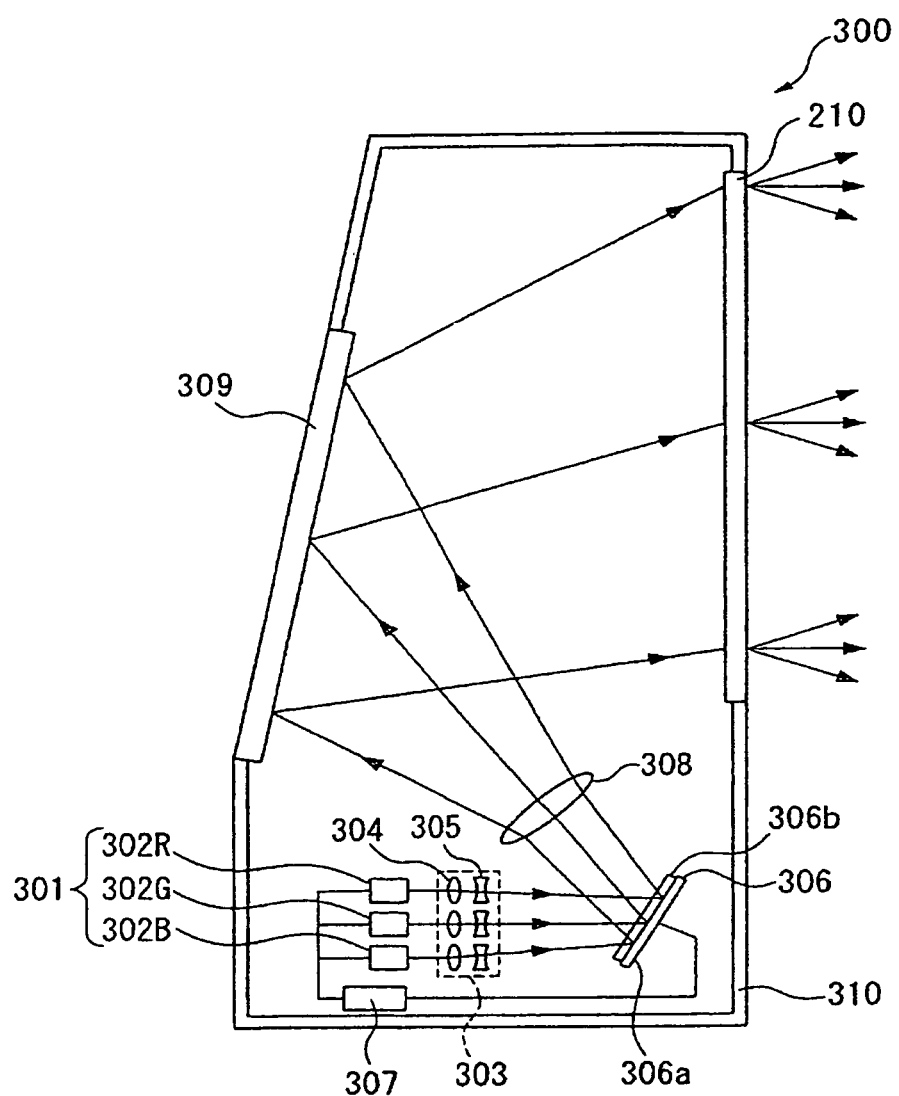
FIG. 27 is a schematic structural view of the image display device according to the eighth embodiment of the invention.

As shown in FIG. 27, an image display device 300 is broadly constituted by a light source device 301 including a laser light source 302R that emits R light, a laser light source 302G that emits G light, and a laser light source 302B that emits B light, a lens optical system 303 that contains a collimating optical system 304 and a beam-adjusting optical system 305, a scanner (scanning unit) 306 that scans incident laser light in a two-dimensional manner, a projection lens 308 that enlarges and projects laser light scanned by the scanner 306, and a reflecting mirror 309 that reflects light projected by the projection lens 308 toward the screen 210. In this image display device 300, the light source device 301, the lens optical system 303, the scanner 306, the projection lens 308, and the reflecting mirror 309 are accommodated in a casing 310 that includes the screen 210, and an image is displayed by scanning the screen 210 with laser light that is led into the casing 310.

Since the image display device according to the invention uses the screen 210 that reduces scintillation while suppressing image blurring, scintillation is suppressed in light emitted from the screen 210. This makes it possible to display a good image with no unevenness in its brightness.

While this embodiment uses screen 210 of the fifth embodiment, it is acceptable to use screen 240 of the sixth embodiment, screen 250 of the seventh embodiment, screen 260 of the eighth embodiment, screen 270 of the ninth embodiment, and screen 280 of the tenth embodiment.

The technical field of the invention is not limited to the foregoing embodiments, it being possible to make various modifications without departing from the spirit or scope of the invention.

For example, the groove provided in the supporting part of the seventh embodiment can be formed in a side face of the rubber that contacts the diffusion plate. This configuration can more effectively restrict the movement of the diffusion plate in the optical axis direction.

While the seventh and the eighth embodiments feature a three-layer structure including the Fresnel plate 211, the diffusion plate 212, and the lenticular plate 213, a two-layer structure including the Fresnel plate 211 and the diffusion plate 212, and a two-layer structure including the Fresnel plate 211 and the lenticular plate 213, are also possible. In the two-layer structure including the Fresnel plate 211 and the lenticular plate 213, scintillation of light emitted from the screen body can be reduced by oscillating the lenticular plate 213 in the same manner as the diffusion plate 212.

Moreover, in the screen 270 and the screen 290 which have two-layer structures, the lenticular plate 213 of the fifth embodiment can be used instead of the diffusion plate 272, and can be oscillated as a diffusion layer. In this configuration, as when oscillating the diffusion plate 272, the light emitted from the screen has reduced scintillation, enabling a good image to be displayed.

Since the elastic force of the elastic member need only be applied in the x-direction and the y-direction in the diffusion plane of the diffusion plate, it is possible to provide, for example, a coil spring at a corner of one top side of the diffusion plate, whereby the casing can hold the diffusion plate while allowing it to oscillate via the coil spring.

Furthermore, while the elastic member (rubber, suspension wire) is here attached to the casing, a frame can be disposed along the outer periphery of the diffusion plate. In this configuration, since the frame holds the diffusion layer with the elastic member therebetween, a screen body that generates vibrations as required can be inserted into the opening of the casing.

While in the configuration described here, antistatic processing is applied to the incidence face and emission face of the diffusion plate, antistatic processing can be applied to the emission face of the Fresnel plate (the surface facing the diffusion plate) and the incidence face of the lenticular plate (the surface facing the diffusion plate). With this configuration, antistatic processing of the emission face of the Fresnel plate and the incidence face of the lenticular plate can suppress electrostatic force generated when the diffusion plate vibrates, enabling the diffusion plate to be moved smoothly.

Instead of antistatic processing, a lubricating resin can be used to form films over the emission face of the Fresnel plate, the incidence face of the lenticular plate, and the incidence and emission faces of the diffusion plate. A lubrication effect can be achieved at the portion where the elastic member (rubber) and the diffusion plate rub together, by using, for at least one of them, polytetrafluoroethylene (PTFE) resin or a metal member whose surface is lubricated.

There is no limitation on using a Fresnel plate as described above, and it need only have a refracting effect; for example, a hologram sheet and such like can be used.

Moreover, while a lenticular plate 13 including half-cylindrical microlens elements is used here, this is not limitative of the invention; for example, it is possible to use an optical element that includes microlens elements that have approximately circular or approximately elliptical cross-sections, when the lenticular plate is seen in plan view. The optical member need only have a light-transmitting plate-like shape; for example, glass and the like can be used.

While laser light sources having high interference are used here as light sources, the effects of the invention can be obtained with coherent light sources such as, for example, high pressure mercury lamps and LEDs.

Furthermore, while light-transmitting liquid crystal light valves are used as light modulation devices, it is also possible to use light-reflecting liquid crystal light valves and micromirror array devices as light-modulating elements. In that case, the projection optical system is modified as appropriate.

The screen can be configured such that it vibrates randomly within the x-y plane. By setting the screen such that it is randomly vibrated by the driving unit, scintillation can be reduced.

A black matrix (light-blocking layer) can be arranged on the emission face of the lenticular plate. This configuration effectively prevents laser light condensed by the microlens elements from returning to the incidence side, and efficiently diffuses the laser light from the emission face. Therefore, a bright and clear image with good contrast can be displayed. While preferred embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

What is claimed is:

1. A screen comprising:
a diffusion layer that diffuses incident light;
an elastic member that movably supports the diffusion layer with respect to a holding part;
a driving unit that moves the diffusion layer in a direction perpendicular to an optical axis of light that is incident to the diffusion layer; and
a plurality of the elastic member, one of which being arranged between a bottom side face of the diffusion layer and the inner face of the holding part, another one of which being arranged between a right side face of the diffusion layer and the inner face of the holding part, and another one of which being arranged between a left side face of the diffusion layer and the inner face of the holding part,
wherein
the diffusion layer is rectangular and is made from plastic material;
the elastic member is arranged in a plane of the diffusion layer and at least between a top side face of the diffusion layer and an inner face of the holding part; and
the driving unit is arranged in a bottom side face of the diffusion layer.

2. The screen according to claim 1, wherein:
at least one of the incidence face and the emission face of the diffusion layer is processed with antistatic treatment.

3. The screen according to claim 1, wherein:
an antistatic processing agent is mixed in the diffusion layer.

4. The screen according to claim 1, wherein:
an antistatic processing agent is applied on the diffusion layer.

5. The screen according to claim 1, wherein:
the plurality of elastic members are each arranged near the centers of the respective faces of the diffusion layer.

6. A screen comprising:
a plurality of layers, wherein
at least one layer among the plurality of layers is the diffusion layer according to claim 1; and
at least one layer among the other plurality of layers is made from plastic material.

7. The screen according to claim 1, wherein
the elastic member is arranged in at least between a central portion of each side face of the diffusion layer and a respective inner face of the holding part.

8. A screen comprising:
a diffusion layer that diffuses incident light;
an elastic member that movably supports the diffusion layer with respect to a holding part; and
a driving unit that moves the diffusion layer in a direction perpendicular to an optical axis of light that is incident to the diffusion layer,
wherein
the diffusion layer is rectangular and is made from plastic material;
the elastic member is arranged in a plane of the diffusion layer and at least between a top side face of the diffusion layer and an inner face of the holding part;
the driving unit is arranged in a bottom side face of the diffusion layer; and
the elastic member is provided to at least one pair of opposing corners.

9. The screen according to claim 8, wherein:
at least one of the incidence face and the emission face of the diffusion layer is processed with antistatic treatment.

10. The screen according to claim 8, wherein:
an antistatic processing agent is mixed in the diffusion layer.

11. The screen according to claim 8, wherein:
an antistatic processing agent is applied on the diffusion layer.

12. A screen comprising:
a plurality of layers, wherein
at least one layer among the plurality of layers is the diffusion layer according to claim 8; and
at least one layer among the other plurality of layers is made from plastic material.

* * * * *